(12) United States Patent
Karasik

(10) Patent No.: US 10,682,988 B2
(45) Date of Patent: Jun. 16, 2020

(54) ENHANCED WASHING DEVICE FOR VEHICLE ACCESSORY

(71) Applicant: Methode Electronics, Inc., Carthage, IL (US)

(72) Inventor: Vladimir Karasik, Walled Lake, MI (US)

(73) Assignee: Methode Electronics, Inc., Carthage, IL (US)

( * ) Notice: Subject to any disclaimer, the term of this patent is extended or adjusted under 35 U.S.C. 154(b) by 218 days.

(21) Appl. No.: 15/802,933

(22) Filed: Nov. 3, 2017

(65) Prior Publication Data

US 2018/0079392 A1    Mar. 22, 2018

Related U.S. Application Data

(63) Continuation-in-part of application No. 15/491,551, filed on Apr. 19, 2017, now Pat. No. 10,391,523, which is a continuation-in-part of application No. 15/428,706, filed on Feb. 9, 2017, now Pat. No. 10,422,992, which is a continuation-in-part of application No. 15/267,938, filed on Sep. 16, 2016, now Pat. No. 10,268,038.

(51) Int. Cl.
*B60S 1/52* (2006.01)
*G02B 27/00* (2006.01)
*B60S 1/56* (2006.01)

(52) U.S. Cl.
CPC . *B60S 1/52* (2013.01); *B60S 1/56* (2013.01); *G02B 27/0006* (2013.01)

(58) Field of Classification Search
CPC .......... B60S 1/52; B60S 1/56; G02B 27/0006; G03B 17/568; B08B 3/04; B08B 2203/0211
See application file for complete search history.

(56) References Cited

U.S. PATENT DOCUMENTS

| 5,588,055 A | 12/1996 | Williamson et al. |
| 5,779,205 A | 7/1998 | Ching |
| 7,891,886 B2 | 2/2011 | Schuetz |

(Continued)

FOREIGN PATENT DOCUMENTS

| CN | 104768802 A | 7/2015 |
| DE | 102011078230 A1 | 1/2013 |

(Continued)

*Primary Examiner* — Kimberly N. Kakalec
(74) *Attorney, Agent, or Firm* — Blank Rome LLP

(57) ABSTRACT

A washing device for a vehicle accessory that includes a washer housing with a ring portion and a fluid source attachment. The ring portion has a main opening for receiving a portion of the vehicle accessory, an attachment side configured for mounting the washer housing, a washing side configured to frame the vehicle accessory, and a transition portion between the ring portion and the fluid source attachment. A nozzle end of the fluid source attachment has at least one fluid channel defined by a nozzle protrusion on the nozzle end. The fluid channel is configured to discharge the fluid to the washing side for cleaning the vehicle accessory by creating a plurality of fluid flow pathways of the fluid between the nozzle end and the transition portion, wherein the plurality fluid flow pathways interact with one another to form at least one vortex in the flow of the fluid.

26 Claims, 15 Drawing Sheets

(56) References Cited

U.S. PATENT DOCUMENTS

| | | |
|---|---|---|
| 8,243,137 B2 | 8/2012 | Schuetz |
| 8,444,329 B2 | 5/2013 | Nakamura et al. |
| 8,448,914 B2 | 5/2013 | Roehr et al. |
| 8,671,504 B2 | 3/2014 | Ono et al. |
| 8,821,043 B2 | 9/2014 | Schutz |
| 8,836,789 B2 | 9/2014 | Liepold et al. |
| 8,857,687 B1 | 10/2014 | An |
| 8,961,044 B2 | 2/2015 | Barthel |
| 8,988,526 B2 | 3/2015 | Schutz |
| 9,150,165 B1 | 10/2015 | Fortin et al. |
| 9,193,308 B2 | 11/2015 | Okuda |
| 9,380,190 B2 | 6/2016 | Pawlowski |
| 9,380,192 B2 | 6/2016 | Barthel |
| 9,446,721 B2 | 9/2016 | Jagoda |
| 9,457,733 B2 | 10/2016 | Schutz |
| 9,487,161 B2 | 11/2016 | Rawlings et al. |
| 9,580,023 B2 | 2/2017 | Bruss et al. |
| 9,725,049 B2 | 8/2017 | Buschmann |
| 9,910,272 B2 | 3/2018 | Witte |
| 2009/0122141 A1 | 5/2009 | Nakamura et al. |
| 2009/0309971 A1 | 12/2009 | Schuetz |
| 2010/0040361 A1 | 2/2010 | Schuetz |
| 2011/0155874 A1 | 6/2011 | Roehr et al. |
| 2011/0292212 A1 | 12/2011 | Tanabe et al. |
| 2012/0007984 A1 | 1/2012 | Schutz |
| 2012/0207461 A1 | 8/2012 | Okuda |
| 2012/0315027 A1 | 12/2012 | Schutz |
| 2013/0182112 A1 | 7/2013 | Liepold et al. |
| 2013/0294758 A1 | 11/2013 | Barthel |
| 2013/0335624 A1 | 12/2013 | Barthel |
| 2014/0085467 A1 | 3/2014 | Barthel |
| 2014/0169866 A1 | 6/2014 | Bruss et al. |
| 2015/0008300 A1 | 1/2015 | Jagoda |
| 2015/0030319 A1 | 1/2015 | Matori |
| 2015/0042804 A1 | 2/2015 | Okuda |
| 2015/0097013 A1 | 4/2015 | Rawlings et al. |
| 2015/0109447 A1 | 4/2015 | Okuda |
| 2015/0203077 A1 | 7/2015 | Gokan |
| 2015/0258944 A1 | 9/2015 | Buschmann |
| 2015/0274089 A1 | 10/2015 | Schutz |
| 2015/0343999 A1 | 12/2015 | Lopez Galera et al. |
| 2015/0344001 A1 | 12/2015 | Lopez Galera et al. |
| 2016/0001330 A1 | 1/2016 | Romack et al. |
| 2016/0101735 A1 | 4/2016 | Trebouet |
| 2016/0103316 A1 | 4/2016 | Rousseau |
| 2016/0245011 A1 | 8/2016 | Schuetz |
| 2016/0272163 A1 | 9/2016 | Dreiocker et al. |
| 2016/0347258 A1 | 12/2016 | Buss |
| 2017/0036650 A1* | 2/2017 | Hester .................. G02B 13/04 |
| 2017/0050581 A1 | 2/2017 | Buss |
| 2017/0064161 A1 | 3/2017 | Buss |
| 2017/0106808 A1 | 4/2017 | Fuchs et al. |
| 2018/0201232 A1 | 7/2018 | Ringler |

FOREIGN PATENT DOCUMENTS

| | | |
|---|---|---|
| EP | 1648737 B1 | 11/2006 |
| EP | 3103684 A1 | 12/2016 |
| GB | 1597004 A | 9/1981 |
| WO | WO-2008014870 A1 | 2/2008 |
| WO | WO-2009056510 A1 | 5/2009 |
| WO | WO-201511439 A1 | 1/2015 |
| WO | WO-2016083317 A1 | 6/2016 |
| WO | WO-2016177577 A1 | 11/2016 |

* cited by examiner

ENHANCED WASHING DEVICE FOR VEHICLE ACCESSORY

RELATED APPLICATIONS

The present application is a continuation-in-part of U.S. patent application Ser. No. 15/491,551, entitled Sensor Washing Device, filed on Apr. 19, 2017, which is a continuation-in-part of U.S. patent application Ser. No. 15/428,706, entitled Camera Lens Washing Device, filed on Feb. 9, 2017, which is a continuation-in-part of U.S. patent application Ser. No. 15/267,938, entitled Camera Lens Washing Device, filed on Sep. 16, 2016, the subject matter of each of which is incorporated herein by reference.

FIELD OF THE INVENTION

The present invention relates to a device for effectively and efficiently washing a vehicle component or instrument, such as a camera, sensor, or any accessory mounted on the vehicle, where the device is designed to enhance cleaning thereof while minimizing overspray.

BACKGROUND OF THE INVENTION

Accessories associated with vehicles, such as cameras and sensors, often become dirty due to environmental and weather conditions, thereby impacting safe driving. Cleaning devices exists to address this problem. See, for example, U.S. Published Patent Application Nos. 2016/0103316 to Rousseau, 2016/0101735 to Trebouet, 2016/0001330 to Romack et al, 2015/0344001 to Lopez Galera et al., 2015/0343999 to Lopez Galera et al., 2015/0203077 to Gokan, and 2011/0292212 to Tanabe et al., the subject matter of each of which is herein incorporated by reference. However, such conventional cleaning devices are often ineffective, obstruct the camera's or the sensor's head field of view, and waste fluid.

Therefore, a need exists for a washing device that effectively and efficiently cleans a vehicle accessory, that is not bulky and does not waste fluid.

SUMMARY OF THE INVENTION

Accordingly, the present invention may provide a washing device for a vehicle accessory, comprising a washer housing that includes a ring portion and a fluid source attachment configured to receive fluid. The ring portion comprises a main opening for receiving at least a portion of the vehicle accessory, an attachment side configured for mounting the washer housing, a washing side configured to frame the vehicle accessory and being in fluid communication with the fluid source attachment, and a transition portion between the ring portion and the fluid source attachment. The fluid source attachment comprises a nozzle end that engages the transition portion of the ring portion. The nozzle end has at least one fluid channel defined by a nozzle protrusion on the nozzle end. The at least one fluid channel is configured to discharge the fluid to the washing side for cleaning the vehicle accessory by creating a plurality of fluid flow pathways of the fluid between the nozzle end and the transition portion, wherein the plurality fluid flow pathways interact with one another to form at least one vortex in the flow of the fluid.

In one embodiment of the present invention the nozzle has a plurality of channels defined by the nozzle protrusion, each of the plurality of fluid channels is configured to discharge the fluid to the washing side for cleaning the vehicle accessory by creating a plurality of fluid flow pathways of the fluid between the nozzle end and the transition portion, wherein the plurality fluid flow pathways interact with one another to form vortices. In certain embodiment, the vortices are in different planes such that they are transverse to one another; the transition portion includes a curved end wall that extends from the washing side of the ring portion and covers the at least one fluid channel for directing the fluid flow pathways; the ring portion includes a curved protrusion for directing the fluid flow pathways, the curved protrusion extends from the washing side of the ring portion and that is located remote from the curved end wall of the transition portion; the plurality of fluid flow pathways flow in different directions with respect to one another; and the plurality of fluid flow pathways have different rates of flow; the at least one fluid channel has a narrow section that leads to an exhaust section that is wider than the narrow section.

The present invention may also provide a washing device for a vehicle accessory, comprising a vehicle accessory with a cleanable surface; a shroud that supports the vehicle accessory and has a front wall with an opening that receives the cleanable surface of the vehicle assembly, and a washer housing that includes a ring portion and a fluid source attachment that is configured to receive fluid. The ring portion comprises a main opening for receiving at least a portion of the vehicle accessory, an attachment side configured for mounting the washer housing, a washing side configured to frame the cleanable surface of the vehicle accessory and being in fluid communication with the fluid source attachment, and a transition portion between the ring portion and the fluid source attachment. The fluid source attachment comprises a nozzle end that engages the transition portion of the ring portion. The nozzle end has a plurality of fluid channels defined by a nozzle protrusion on the nozzle end. Each of the plurality of fluid channels is configured to discharge the fluid to the washing side for cleaning the cleanable surface of the vehicle accessory by creating a plurality of fluid flow pathways of the fluid between the nozzle end and the transition portion, wherein the plurality fluid flow pathways interact with one another to form vortices in the flow of the fluid.

In one embodiment, the fluid source attachment and the ring portion are separate components engageable with one another. In some embodiments, the vortices are in different planes; the transition portion includes a curved end wall that extends from the washing side of the ring portion and covers the at least one fluid channel for directing the fluid flow pathway; and the ring portion includes a curved protrusion for directing the fluid flow pathways that extends from the washing side of the ring portion and that is located remote from the curved end wall of the transition portion. In other embodiments, a bottom of the ring portion at the curved protrusion is devoid of any fluid channels; the plurality of fluid flow pathways flow in different directions with respect to one another; the plurality of fluid flow pathways have different rates of flow; each of the plurality of fluid channels has a narrow section that leads to an exhaust section that is wider than the narrow section; and the exhaust section has different length sides that diverge away from one another to create the plurality of fluid pathways with different lengths. In still other embodiments, the washing device includes a mounting member that has a ring body with at least one locking feature for engaging both the attachment side of the ring portion and an inner surface of the shroud; and the locking feature is a substantially T-shaped leg extending from the ring body, the attachment side of the ring portion includes at least one pocket for receiving a portion of the T-shaped leg and the inner surface of the shroud has at least one pocket for receiving another portion of the T-shaped leg.

The present invention may further provide a washing device for a vehicle accessory that comprises a vehicle accessory with a cleanable surface, a shroud that supports the vehicle accessory where the shroud has a front wall with an opening that displays the cleanable surface of the vehicle assembly, and a washer housing that includes a ring portion and a fluid source attachment, the fluid source attachment being configured to receive fluid. The ring portion comprises a main opening for receiving at least a portion of the vehicle accessory, an attachment side configured for mounting the washer housing to the shroud, a washing side configured to frame the cleanable surface of the vehicle accessory and being in fluid communication with the fluid source attachment, and a transition portion between the ring portion and the fluid source attachment. The fluid source attachment comprises a nozzle end engaging the transition portion of the ring portion where the nozzle end has at least one fluid channel configured to discharge the fluid to the washing side of the ring portion for cleaning the cleanable surface of the vehicle accessory by creating at least one fluid flow pathway of the fluid between the nozzle end and the transition portion. A mounting member may be provided that is movable between unlocked and locked positions for mounting the washer housing to the shroud. The mounting member has a ring body with at least one locking feature that engages both the attachment side of the ring portion of the washer housing and an inner surface of the shroud when the mounting member is in the locked position, thereby securing the washer housing and vehicle accessory to the shroud.

In one embodiment of this washing device, the locking feature is a substantially T-shaped leg extending from the ring body, the attachment side of the ring portion includes at least one pocket for receiving a portion of the T-shaped leg and the inner surface of the shroud has at least one pocket for receiving another portion of the T-shaped leg. In another embodiment, the mounting member may comprise a flex arm extending from the ring body that engages an inwardly extending detent of the shroud when the mounting member is in the locked position.

The present invention may yet further provide a method for washing a vehicle accessory, comprising the steps of providing a vehicle accessory with a cleanable surface; providing a washer housing including a ring portion and a fluid source attachment, the fluid source attachment being configured to receive and distribute fluid, the ring portion comprising a washing side configured to frame the cleanable surface of the vehicle accessory and being in fluid communication with the fluid source attachment, and the fluid source attachment comprising a nozzle end engaging the transition portion of the ring portion, the nozzle end having a plurality of fluid channels defined by a nozzle protrusion on the nozzle end; discharging fluid from the fluid source attachment through the plurality of fluid channels to create a plurality of fluid flow pathways at the nozzle; and directing the fluid discharged through the plurality of fluid channels to the cleanable surface of the vehicle accessory such that the fluid flow pathways interact with one another to form vortices and oscillation in the fluid, thereby cleaning residue from the cleanable surface. In one embodiment, the method further includes to step of forming the vortices in different planes such that the vortices are transverse to one another.

In some embodiments the method comprises the steps of mounting the washer housing to a shroud using a mounting member that moves between locked and unlocked positions wherein at least one locking feature engages pockets in the shroud and in the ring portion of the washer housing when in the locked position; and aligning the pockets of the shroud and the ring portion when the mounting member is in the unlocked position and rotating the mounting member to the unlocked position wherein the at least one locking feature engages the pockets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures.

DETAILED DESCRIPTION OF THE INVENTION

Figure 1:
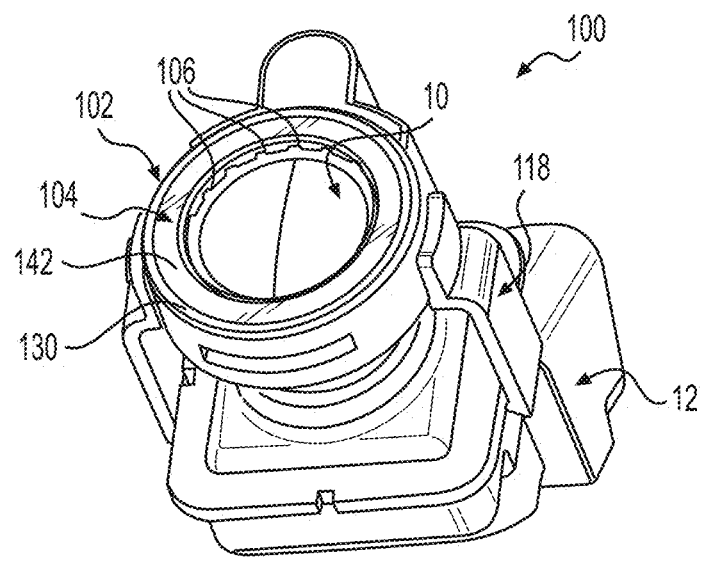
FIG. 1 is a perspective view of a camera lens washing device according to an exemplary embodiment of the present invention.

Referring to the figures, the present invention relates to a washing device 100 (FIGS. 1-5), 100' (FIGS. 6 and 7), 100"

(FIGS. 8A-14), and/or 100''' (FIGS. 15, 16A, and 16B) for a camera lens 10 or a sensor 20, such as for a camera or sensor mounted on a vehicle. Both the washing device 100, 100', 100'' for the camera lens and the washing device 100''' for the sensor, have a simplified design while providing improved washing of the camera lens or sensor head without impeding that field of view of the camera lens or the detecting function of the sensor head.

As seen in FIGS. 1-7, the camera lens washing device 100 and 100' generally includes an outer housing 102 and an inner ring 104 that cooperate with one another to form multiple nozzles 106 therebetween that are preferably disposed around a top side of the camera lens 10 for discharging fluid, such as water or other lens washing fluid, radially inwardly and toward the camera lens 10 for cleaning the same. The washing fluid is preferably under pressure to be distributed through the nozzles 106 creating multiple fluid jets from different locations toward the center of the camera lens 10. The camera lens washing device 100 and 100' has an improved compact design and camera field of view.

Figure 2:
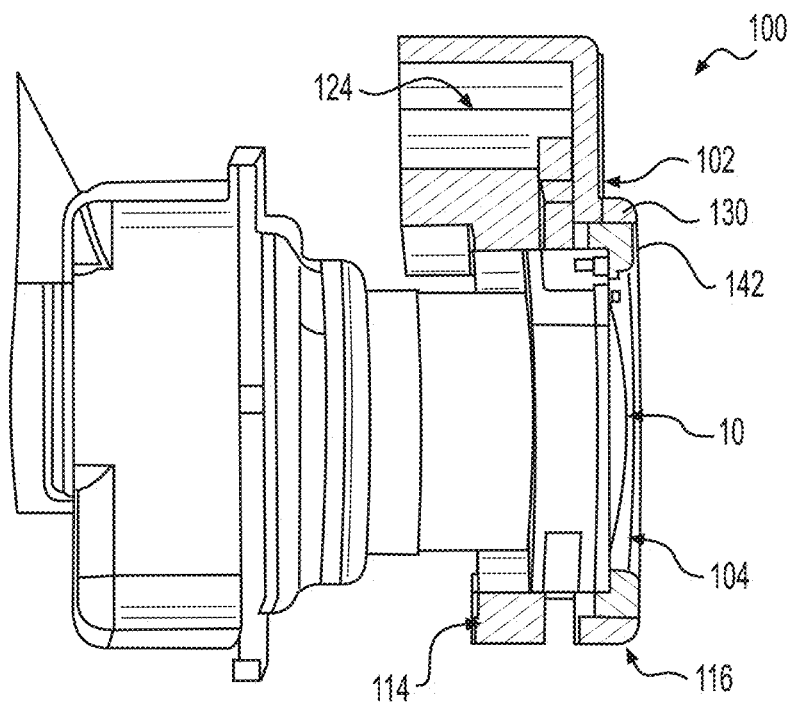
FIG. 2 is side elevational cross-sectional view of the camera lens washing device illustrated in FIG. 1.
Figure 3:
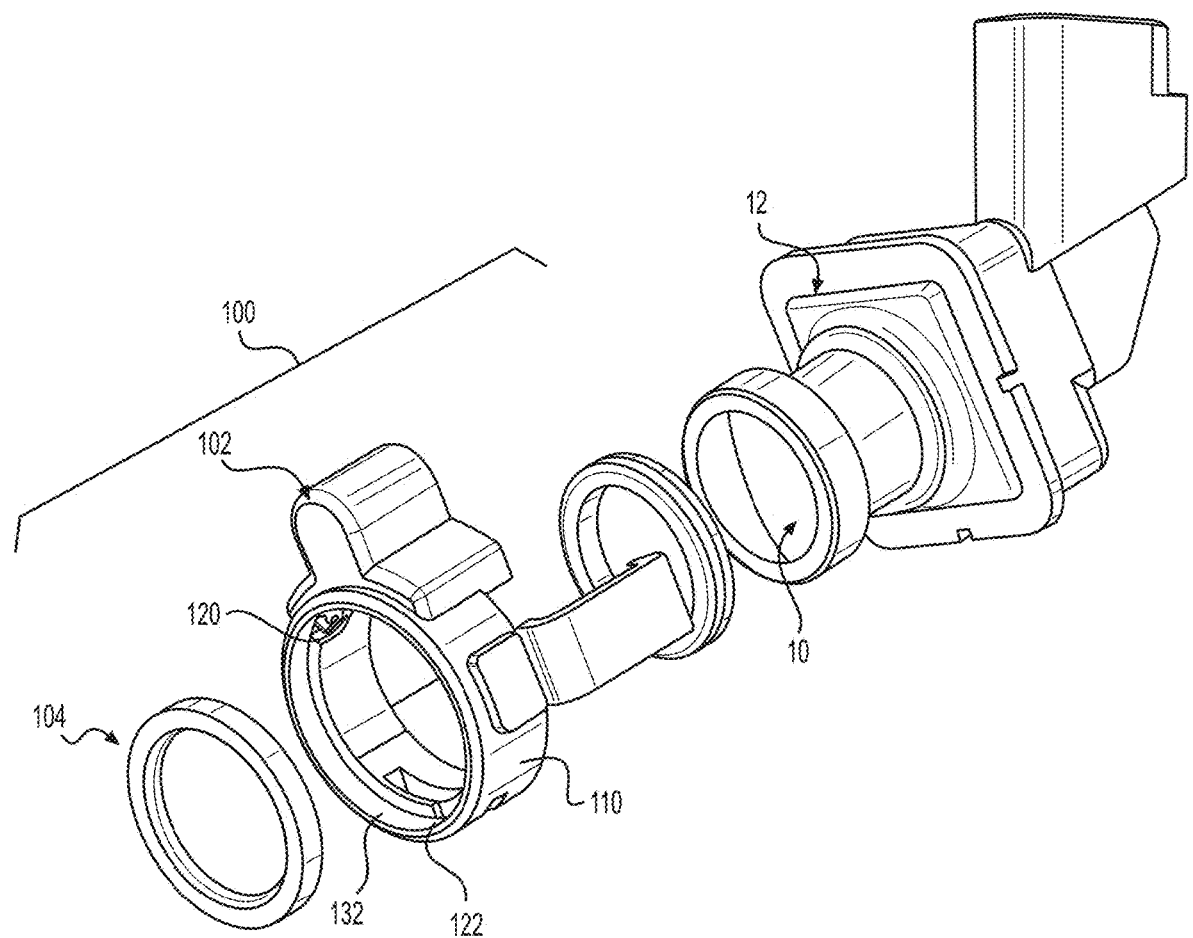
FIG. 3 is an exploded perspective view of the camera lens washing device illustrated in FIG. 1.

Outer housing 102 generally includes a main body 110 that may be substantially ring shaped and includes a main opening 112 therein for receiving the camera lens 10. One end of main body 110 is an attachment end 114 configured to mount to a camera housing 12 of the lens 10. The other end of main body 110 is an exposed end 116, as best seen in FIG. 2. In one embodiment, attachment end 114 includes one or more latching arms 118 that extend from main body 110 in a direction away from exposed end 116 for snap fitting onto the camera housing 12. Alternatively, attachment end 114 may include other known methods of attachment, such as screw fastening or adhesive. Main opening 112 of outer housing 102 includes a top side 120 and an opposite bottom side 122. A fluid source attachment 124 is provided in the outer housing 102 that is configured for engagement with a fluid source, such as a water hose or line. Fluid source attachment 124 may be an extension with an inner bore 126 in fluid communication with the nozzles 106. Fluid source attachment 124 is preferably located at the top side 120 of main opening 112 in outer housing 102 to allow the fluid to flow downwardly towards the nozzles 106.

Figure 4:
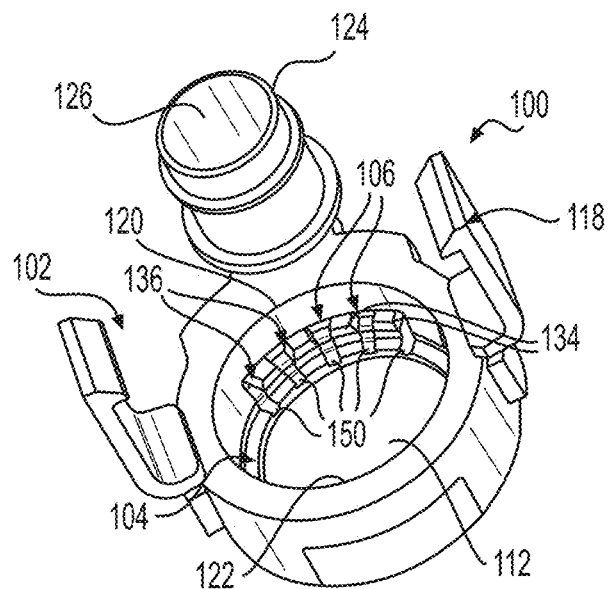
FIG. 4 is a perspective view of a housing subassembly of the camera lens washing device illustrated in FIG. 1.
Figure 5:
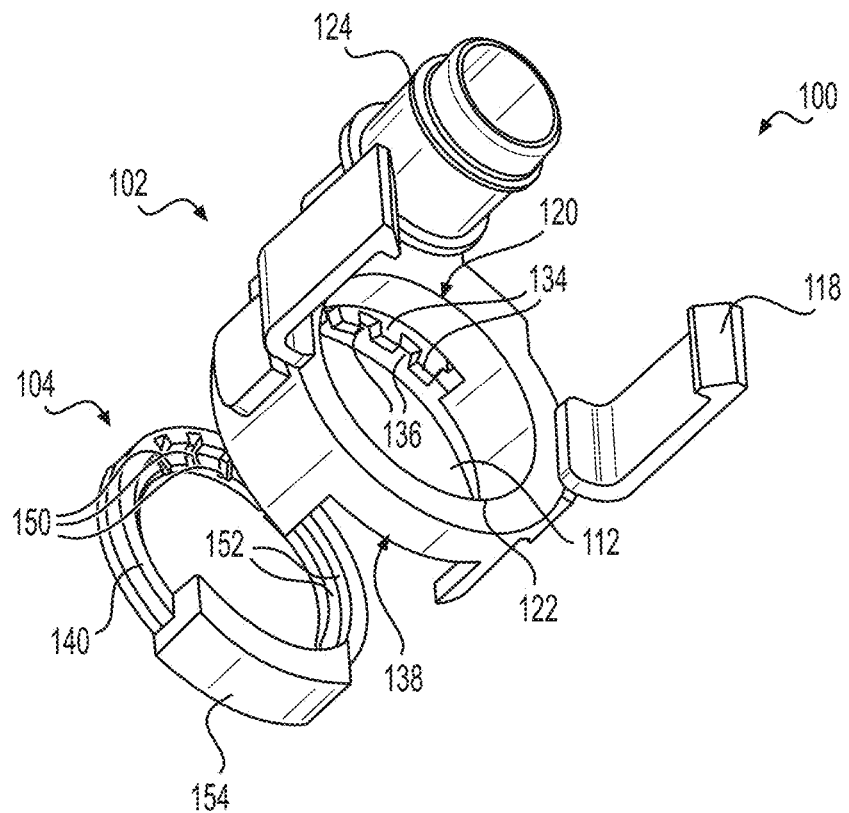
FIG. 5 is an exploded perspective view of the housing subassembly illustrated in FIG. 4.

Exposed end 116 of outer housing 102 includes an end face 130. A recessed area 132 extends inwardly from end face 130 for accepting inner ring 104. Extending inwardly from main opening 112 are spaced tabs 134 which define fluid path slots 136 therebetween, as best seen in FIGS. 4 and 5, which are in fluid communication with fluid source attachment 124. Spaces tabs 134 may be located adjacent to recessed area 132. Remote from the spaced tabs 134 on main body 110 is an alignment member 138 for aligning inner ring 104 with respect to outer housing 102.

Inner ring 104 is configured and sized to frame the camera lens 10, as best seen in FIG. 1. Inner ring 104 is preferably formed separately from outer housing 102 and is received in recessed area 132 of outer housing 102. Inner ring 104 may be fixed to outer housing 102, such as by laser welding inner ring 104 in recessed area 132 or by other known attachments. Inner ring 104 includes a mounting face 140 (FIG. 5) that engages recessed area 132 and an opposite exposed face (FIG. 1) 142. An inner diameter surface 144 of inner ring 104 is between mounting face 140 and exposed face 142. In a preferred embodiment, exposed face 142 of inner ring 104 does not extend beyond and is substantially flush with end face 130 of outer housing 102, as seen in FIG. 2, thereby not negatively impacting the camera's field of view.

A plurality of channels 150 are provided in inner diameter surface 144 of inner ring 104, as best seen in FIGS. 4 and 5.

Channels 150 substantially align with fluid path slots 136 of outer housing 102 to form the nozzles 106. Each channel 150 substantially aligns with one of the fluid path slots 136 to form one of the nozzles 106. Each channel 150 preferably extends into mounting face 140 of inner ring 104 and may include a step 152 to facilitate fluid flow through nozzles 106.

Remote from channels 150 is an alignment member 154 that corresponds to alignment member 138 of outer housing 102 to ensure proper alignment between inner ring 104 and outer housing 104 to form the nozzles 106. In one embodiment, alignment member 154 may be a protruding flange (FIG. 5), for example, and alignment member 138 may be a cut-out in main body 110 sized to accept flange 154, or vice versa. The alignment member 138 preferably includes a channel that allows the fluid or water from the fluid source attachment 126 to pass therethrough to the channels 150 and slots 136 of nozzles 106.

Other alignment or keying methods may be used as long as channels 150 and slots 136 are substantially aligned in order to form the nozzles 106. Nozzles 106, including tabs 134 and channels 150, are preferably located at or near the top side 120 of main opening 112 such that fluid from fluid source attachment 124 can flow downwardly through slots 136 and channels 150 so that nozzles 106 discharge the fluid directly onto the camera lens 10. And because nozzles 106 are on the top of the lens 10, gravity will subsequently wash away the fluid from the lens 10. In a preferred embodiment, none of the nozzles 106 are located at the bottom, that is the bottom side 122 of the main opening 112 such that the nozzles 106 are only provided near or at top side 120. The nozzles 106 may be evenly spaced from one another and radially arranged with respect to the lens 10, as best seen in FIG. 4. The alignment member 138 and a protruding flange 154 may form a slot 822, FIG. 12B, that allows fluid to drain from the washing area, thereby preventing debris from accumulating. This may be particularly useful for vertical camera positioning.

A sealing member 160, such as a seal ring, may be provided on attachment end 114 to seal the plurality of channels 150 and slots 136 between inner ring 104 and outer housing 102.

Figure 6:
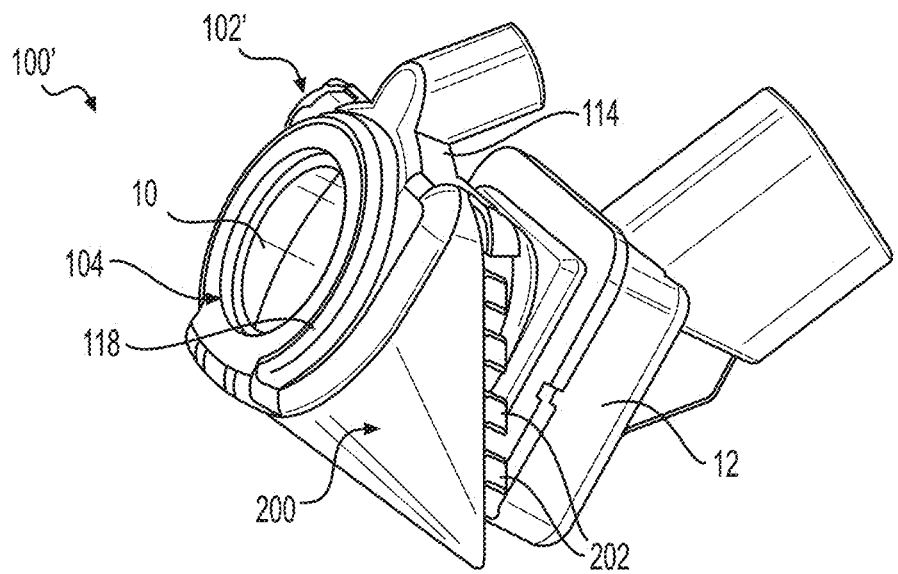
FIG. 6 is a perspective view of a camera lens washing device according to an alternative exemplary embodiment of the present invention.
Figure 7:
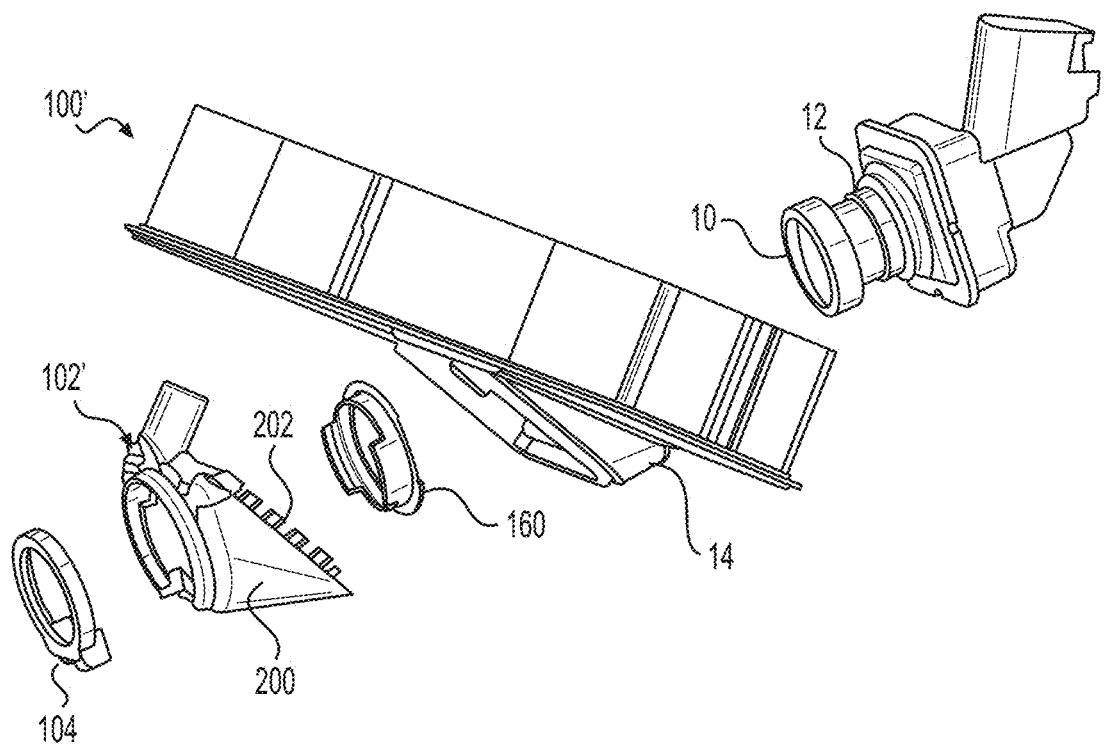
FIG. 7 is an exploded perspective view of the camera lens washing device illustrated in FIG. 6.
Figure 8A:
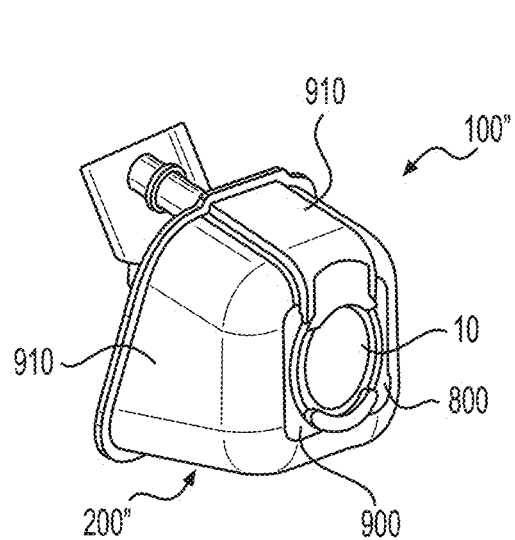
FIGS. 8A and 8B are perspective views a camera lens washing device according to yet another exemplary embodiment of the present invention.
Figure 8B:
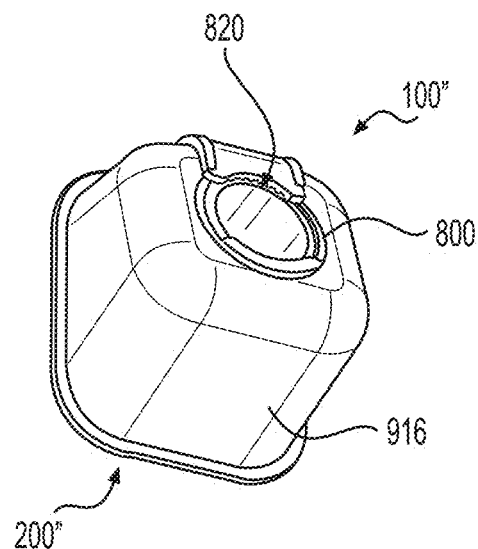
Figure 9:
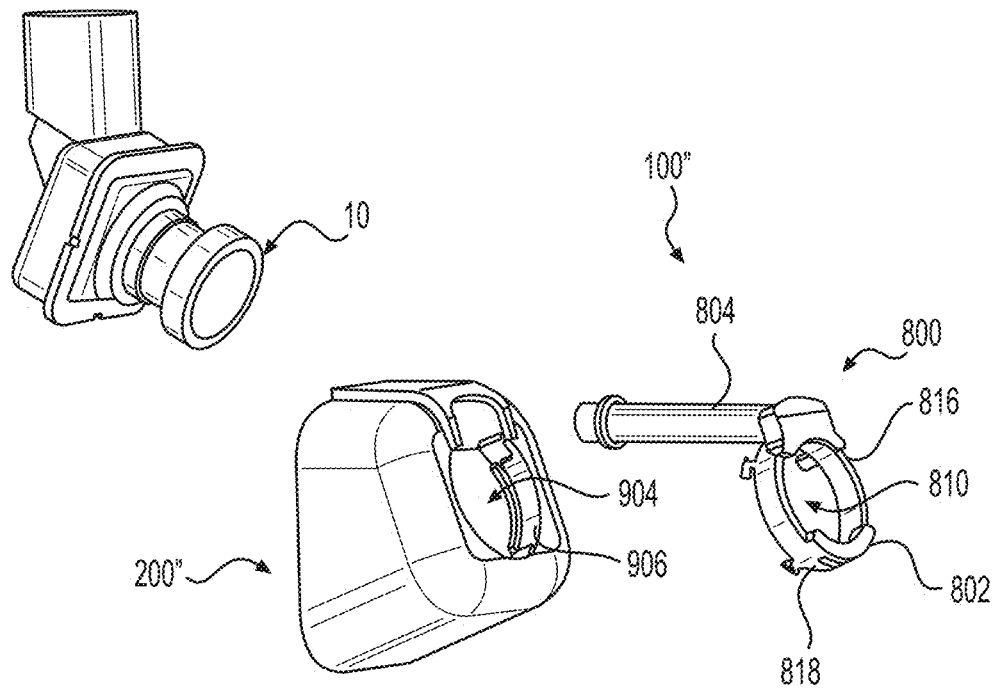
FIG. 9 is an exploded view of the camera lens washing device illustrated in FIGS. 8A and 8B.

FIGS. 6 and 7 illustrate an alternative embodiment of the camera lens washing device 100'. Camera lens washing device 100' is substantially the same as the camera lens washing device 100 of the first embodiment, except that the outer housing 102' thereof includes shroud extension 200 for attaching to a camera module 14 that supports the camera lens 10. Shroud extension 200 replaces latch arms 118 and may include an engagement member 202, such as a plurality of teeth, for engaging the camera module 14. Shroud extension 200 is extends away from the exposed end 116 of outer housing 102' and is preferably sized to substantially surround the camera lens.

Figure 15:
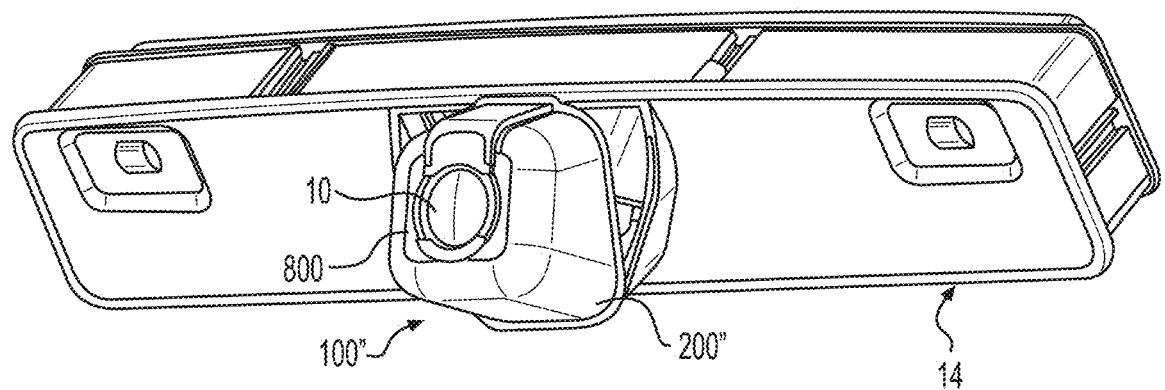
FIG. 15 is a perspective view of the camera lens washing device illustrated in FIGS. 8A and 8B, showing the device supported by the camera module.

FIGS. 8A, 8B, and 9-11 illustrate yet another exemplary embodiment of a camera lens washing device 100'' in accordance with the present invention. Camera lens washing device 100'' has fewer components and provides a fluid source attachment that is positioned inside of the shroud 200'' (FIG. 10) resulting in a more compact design overall. The shroud 200'' is configured to mount to the camera module 14 that is in turn mounted to the vehicle, such as at the tailgate of the vehicle. By providing a more compact camera lens washing device 100'' with the fluid source attachment inside of the shroud 200'', the existing vehicle structure, such as the tailgate structure, is not affected and requires no modification to mount device 100''. For example, no additional holes are needed in the tailgate structure, which is typically sheet metal, to mount the compact camera lens washing device 100", as seen in FIG. 15. By eliminating the need for additional holes in the tailgate structure, integrity problems associated with holes located too close to the welds of the tailgate structure can be avoided. Additionally, this compact design also avoids the difficulty in punching holes in the tailgate structure due to the welds thereof have hardening the structure and the limited space for the holes.

Figure 12A:
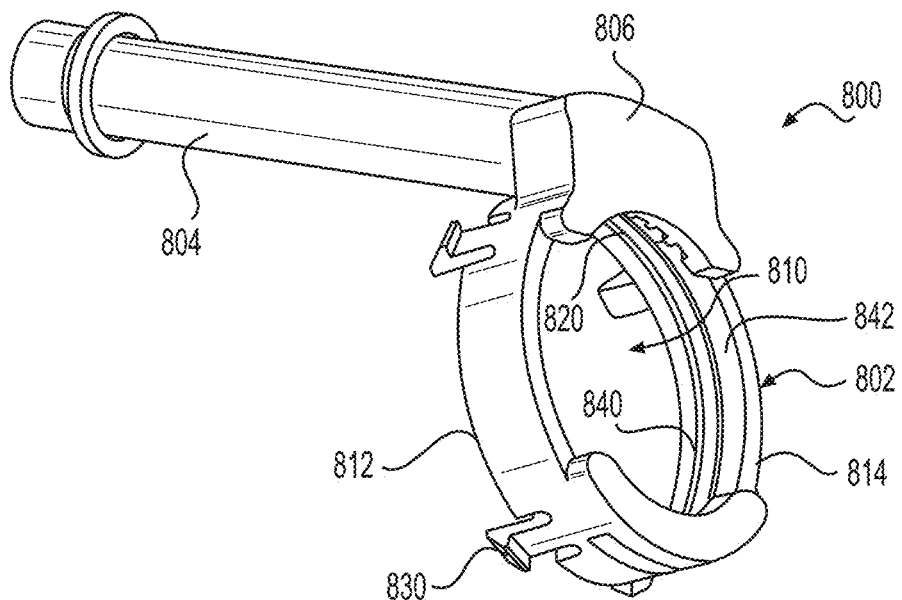
FIGS. 12A and 12B are perspective views of a washer housing according to one embodiment of the camera lens washing device illustrated in FIGS. 8A and 8B.
Figure 12B:
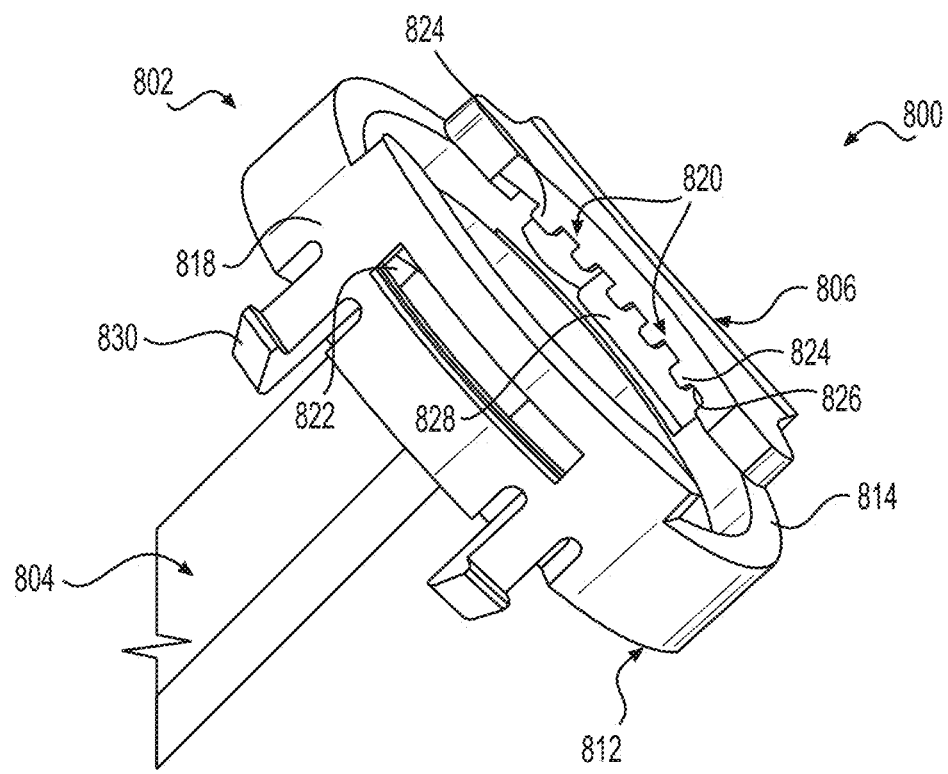

FIGS. 12A and 12B illustrate one exemplary embodiment of a washer housing 800 of camera lens washing device 100". Washer housing 800 comprises a ring portion 802, a fluid source attachment 804, and a transition portion 806 therebetween. In a preferred embodiment, washer housing 800 is a unitary one-piece member. The unitary one-piece washer housing 800 may be formed by a molding process, for example. Ring portion 802 generally includes a main opening 810 for receiving the camera lens 10, an attachment side 812 for mounting housing 800 to shroud 200", and a washing side 814 that frames the camera lens 10 and is in fluid communication with fluid source attachment 804 through transition portion 806. The attachment side 812 preferably includes one or more engagement members 830 for engaging shroud 200". The engagement members 830 may be snap legs, for example, that extend from attachment side 812. A sealing member 840, such as a rubber gasket, may be provided on the inner surface 842 of ring portion 802 around main opening 810 to seal the area behind washing side 814.

Fluid source attachment 804 of washer housing 800 extends from transition portion 806 in a direction away from washing side 814 and toward the direction in which attachment side 812 faces, as best seen in FIG. 12A. Fluid source attachment 804 may be, for example, a hose portion of washer housing 800 that extends from transition portion 806 and accepts the fluid for washing the camera lens 10.

One or more nozzles 820 are disposed on transition portion 806 at the top 816 of ring portion 802 on the washing side 814 thereof. Each nozzle 820 is designed to discharge fluid received from fluid source attachment 804 generally radially inwardly and downwardly towards main opening 810 and the camera lens 10, in a similar manner as the above embodiments. The bottom 818 of the ring portion 802 does not include any nozzles 820. That is, the nozzles 820 are disposed only at or near the top 816 of ring portion 802. Bottom 818 may include a lateral slot 822 (FIG. 12B) that facilitates the molding process when forming washer housing 800.

Figure 11:
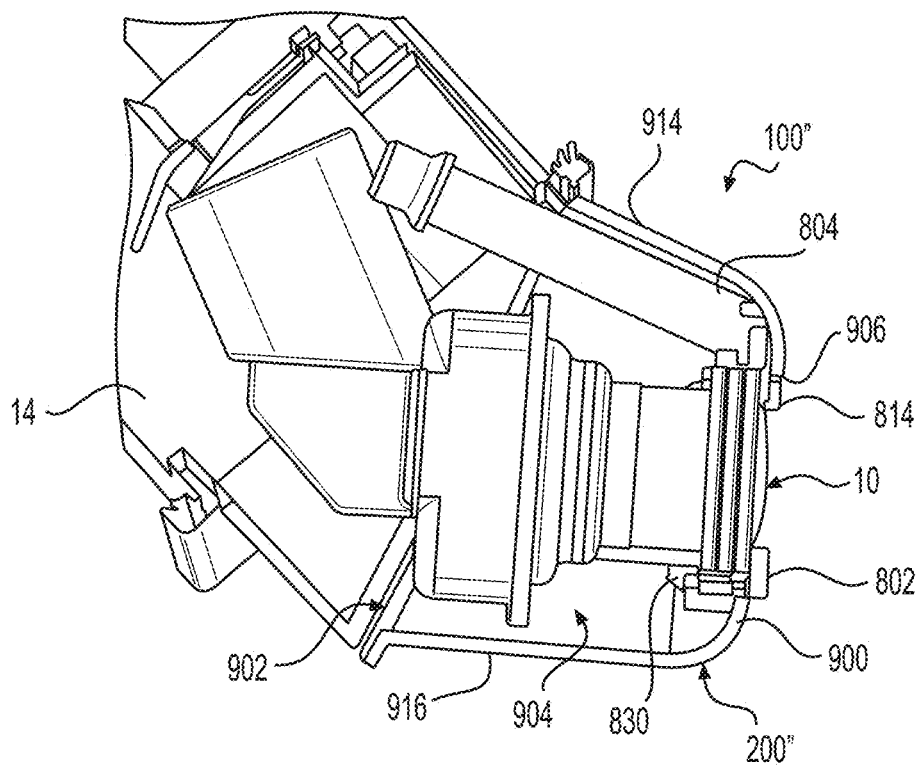
FIG. 11 is a side elevational cross-sectional view of the camera lens washing device illustrated in FIGS. 8A and 8B, showing the device supported by a vehicle camera module.

As seen in FIGS. 12A and 12B, the one or more nozzles 820 are defined by one or more tabs 824 extending from transition portion 806 toward main opening 810. The tabs 824 define fluids path slots 826 therebetween of nozzles 820 which direct the fluid towards camera lens 10 (FIG. 11). A recessed area 828 may be provided at the top 816 of ring portion 802 adjacent or near the tabs 824 to facilitate fluid flow to main opening 810.

FIGS. 13A-13E illustrate another exemplary embodiment of a washer housing 800'. Like washer housing 800, washer housing 800' comprises a ring portion 802', a fluid source attachment 804', and a transition portion 806'. These components may be formed separately and attached or may form a unitary one-piece member. Ring portion 802' generally includes a main opening 810' for receiving a cleanable surface 22 (such as a lens of a camera or detecting head of a sensor) of the vehicle accessory 10 (such as a camera or sensor), an attachment side 812' for mounting housing 800', and a washing side 814' in fluid communication with fluid source attachment 804' through transition portion 806'.

Fluid source attachment 804' has a nozzle end 840 that couples to transition portion 806'. Nozzle end 840 has a curved wall 842 having a curved inner surface 844. Curved wall 842 is configured to fit in a corresponding slot 846 of transition portion 806'. The fluid source attachment 804' may slide down through the slot 846 in ring portion 802' until it touches a hard stop. Then the ring portion may be secured via its attachment side 812' to the shroud, such as by using a lock ring or the like.

Figure 13A:
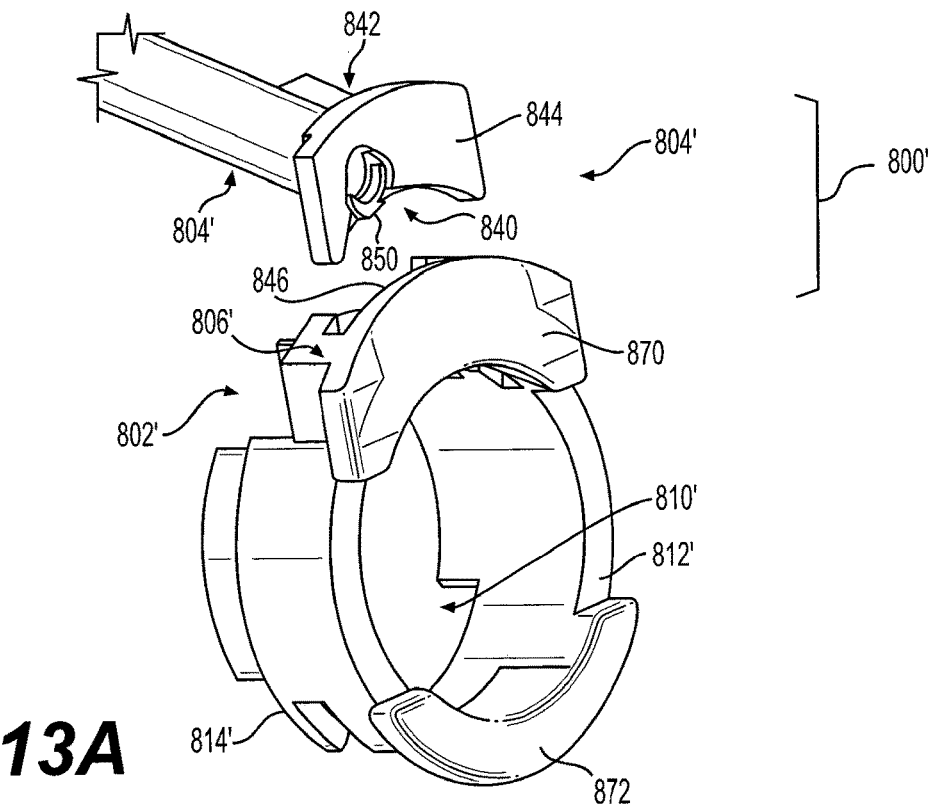
FIGS. 13A-13E are various views of a washer housing according to another embodiment of the present invention.
Figure 13B:
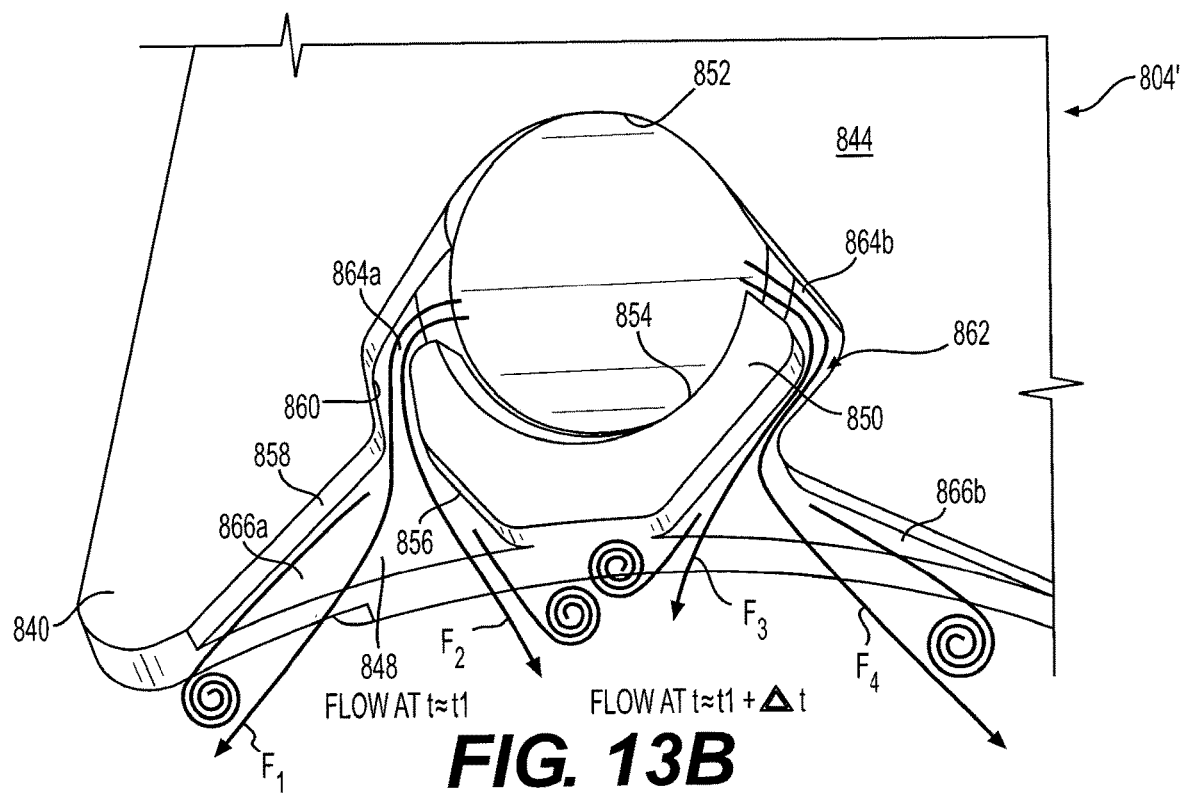

A nozzle protrusion 850 is provided in the fluid path of fluid source attachment 804' at the distal end opening 852 of nozzle end 840, as seen in FIG. 13B. Nozzle protrusion 850 extends outwardly away from a recessed area 848 of curved inner surface 844 of curved wall 842 and has an inner and outer curved sides 854 and 856. Inner curved side 854 of nozzle protrusion 850 is associated with distal end opening 852 and is in the fluid path of the fluid exiting distal opening 852, as best seen in FIG. 13B. Outer curved side 856 of nozzle protrusion 850 defines a plurality of fluid channels 860 and 862. Each fluid channel 860 and 862 preferably has a narrow section 864a and 864b, respectively, and an exhaust section 866a and 866b, respectively, that is wider than narrow section 864a and 864b. Each of the fluid channels 860 and 862 is designed to be a "power nozzle" where fluid speed increases before discharge. The width of narrow sections 864a and 864b may be substantially the same or different. Likewise, the size of exhaust sections 866a and 866b may be substantially the same or different. In one embodiment, each exhaust section 866a and 866b has different length sides, one created by the nozzle protrusion's outer curved surface 856 and the other created by an inner surface 858 of recessed area 848, where the sides diverge from one another to facilitate discharge of the fluid, as best seen in FIGS. 13B and C. The design and shape of each fluid channel 860 and 862, particularly as defined by nozzle protrusion 850, creates a number of fluid flow pathways $F_1$, $F_2$, $F_3$, $F_4 \ldots F_n$ that preferably extend in different directions, such as two outward pathways $F_1$ and $F_4$ and two inward pathways $F_2$ and $F_3$, and may have different lengths and fluid flow rates. The design of different fluid flow pathways and rates through the different protrusion shapes and interaction has intension to form a range of vortices on cleaning area.

Figure 13C:
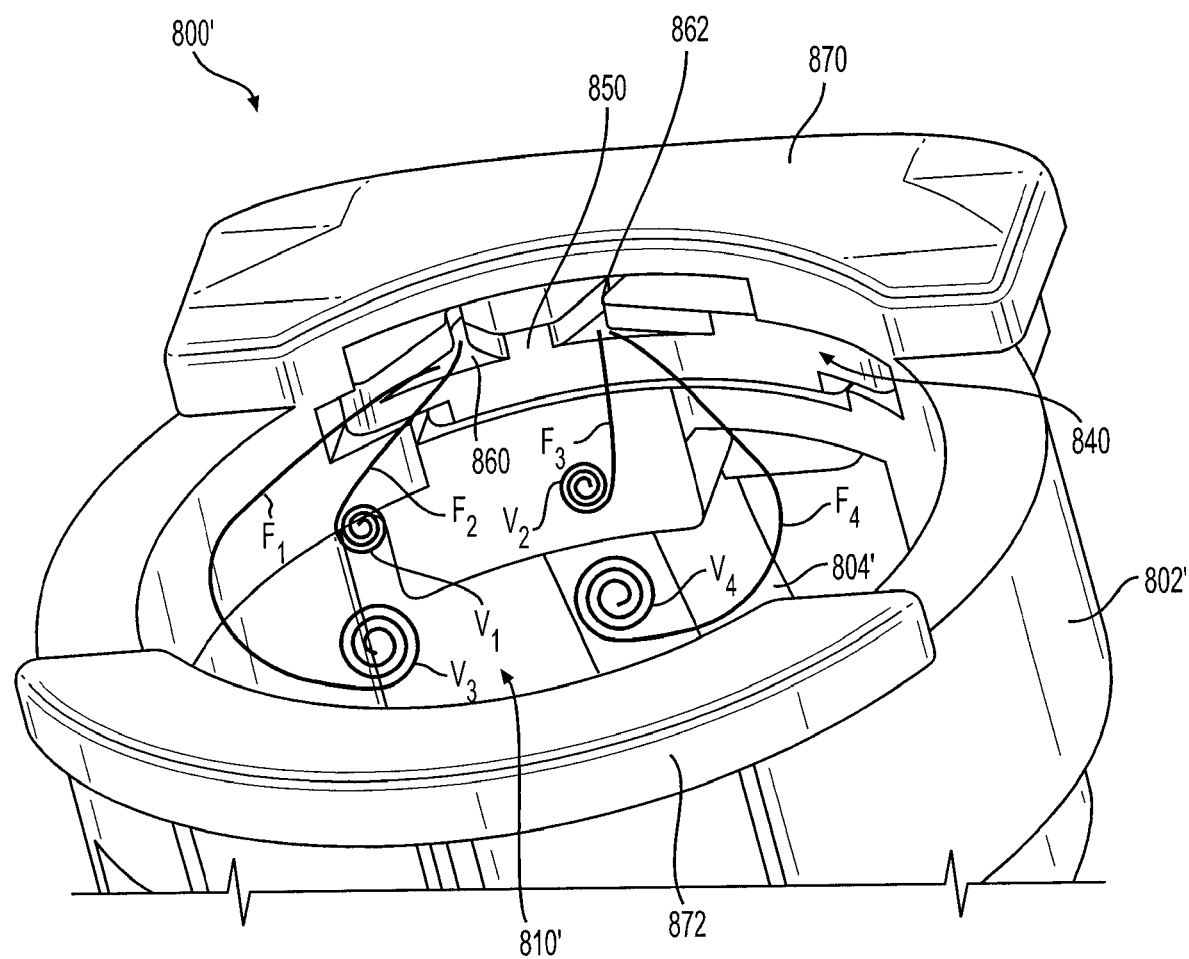
Figure 13D:
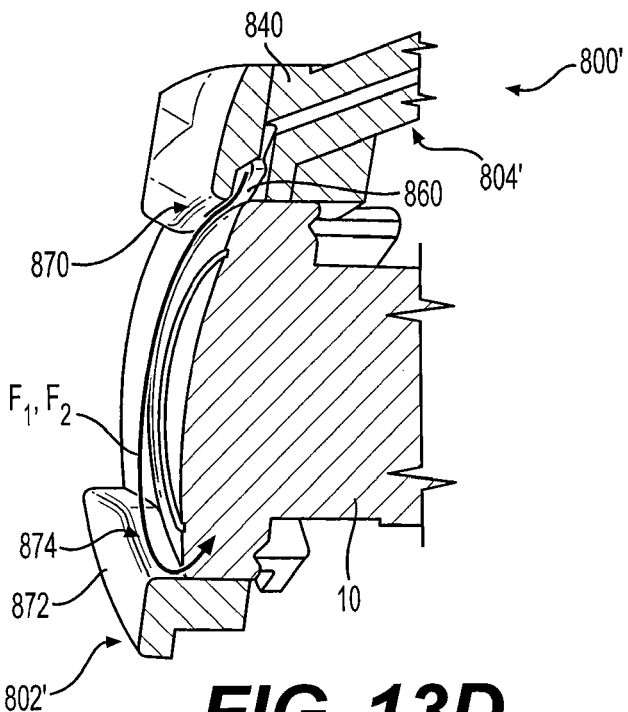
Figure 13E:
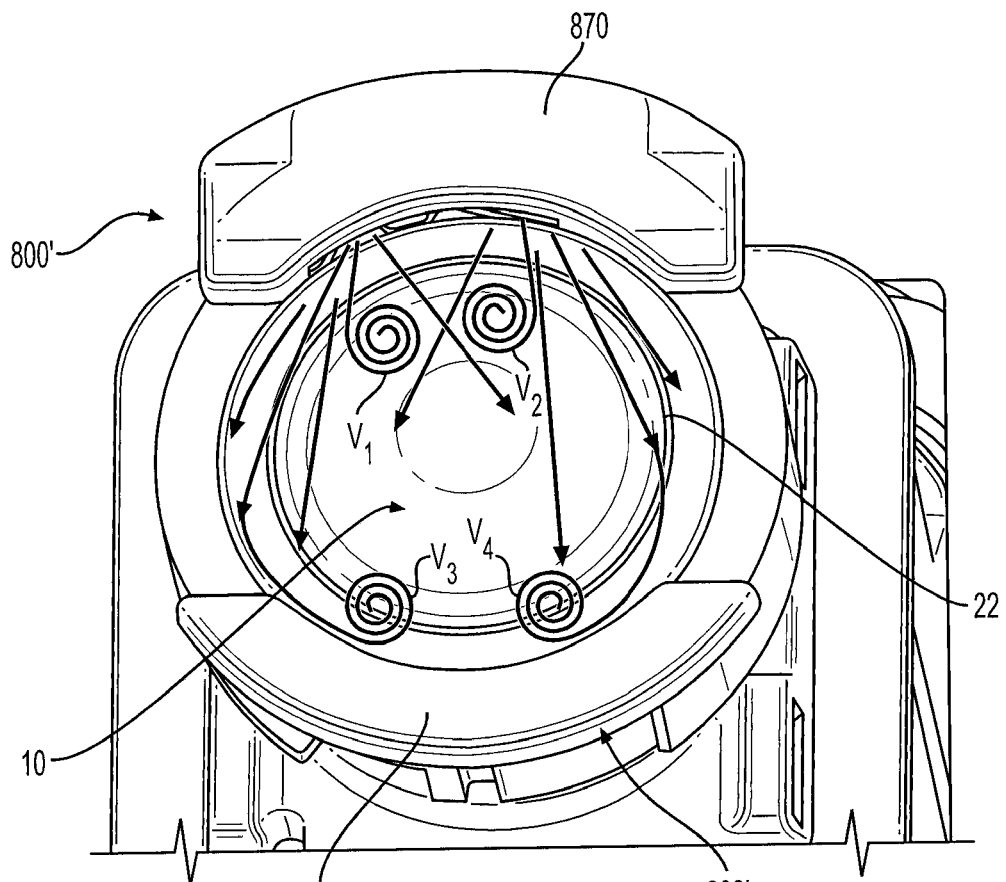

As seen in FIG. 13C, the fluid channels 860 and 862 may be covered by a curved end wall 870 of transition portion 806' to direct the fluid flow pathways toward the cleanable surface 22 (FIG. 13E) of the vehicle accessory 10. Ring portion 802' preferably has a curved protrusion 872 extending from its washing side 814' and is located opposite curved end wall 870.

When fluid is directed through nozzle end 840 of fluid source attachment 806' and its fluid channels 860 and 862 and discharged for washing the cleanable surface of the vehicle accessory, the fluid flow pathways $F_1$, $F_2$, $F_3$, $F_4$ will interact. The fluid mechanics of such interaction of the fluid flow pathways $F_1$, $F_2$, $F_3$, $F_4$ forms fluid oscillation and creates vortices, such as vortices $V_1$ and $V_2$. As the fluid flow pathways travel downward toward the curved protrusion 872, more vortices, such as vortices $V_3$ and $V_4$, are created when the fluid flow pathways $F_1$, $F_2$, $F_3$, $F_4$ interact with the inner curved surface 874 (FIG. 13D) of curved protrusion 872 that faces against fluid end opening 852 (FIG. 13B) resulting in vortices in a different planes. In a preferred embodiment, vortices $V_1$ and $V_2$ are in a different plane at vortices $V_3$ and $V_4$. For example, vortices $V_1$ and $V_2$ may be in a vertical plane defined between transition end wall 870 and curved protrusion 872 where vortices $V_3$ and $V_4$ may be in a horizontal plane, that is transverse to vortices $V_1$ and $V_2$, and seen in FIGS. 13C and 13D. It will be understood that any number of fluid channels may be used to form the fluid flow pathways which in turn interact to form any number of vortices.

Each fluid flow pathway $F_1$, $F_2$, $F_3$, $F_4$ generally has three regions including initial, transition and final regions. In the initial region, the fluid flow pathway can be considered a solid continuous beam with a high dynamic pressure and little air content. A mist zone begins to form on edges of the fluid flow pathway and this is when the fluid begins mixing with air and vortices are observed. At the end of initial region, the interaction of the fluid flow pathway with the surrounding air results in the breakup of the fluid flow pathway into droplets, a reduction of fluid velocity, and a widening of the effective flow field. It is the transition zone or region that typically provides the surface cleaning. All three regions of the fluid flow pathways generate a dynamic stress such that residue material is removed from a cleanable surface when equivalent dynamic stress is higher than or equal to the endurance limit of the residue, that is water-hammer pressure is applied to remove residue.

A vortex is a fluid structure that possesses circular or swirling motion along the edge thereof and causes from the shear force between streams with different motion. The featuring property of any shear layer is the difference of velocity between its two sides: the further side of shear layer that detaches from the wall moves with a speed that is higher than the side closer to the wall due to friction affect. Therefore, the separating shear layer curves on itself and eventually rolls-up into tight spiral shape. Smaller vortices, such as vortices $V_1$ and $V_2$, may be created close to the nozzle end 840 and grow in size as carried along the flow until they fully interrupt the fluid flow pathways. The vortices then collapse creating a fully turbulent flow. Vortices are a result of a self-organizing flow where a substance rotates around its own axis with a decreasing radius. The speed of rotation increases toward the center where a sub-pressure forms. The speed at the center of the vortex is greatest and capable of breaking through dimensional boundaries. As such, because the speed of rotation increases toward the center of the vortex, it creates a low pressure area there and debris will be lifted. Discharge of fluid flow pathways $F_1$, $F_2$, $F_3$, $F_4$ onto the cleanable surface adjacent any vortex, such as vortices $V_1$-$V_4$, lift adsorbed or occluded residue on the surface to clean the same. Thus, the fluid oscillation and vortices created by the interactions of the fluid flow pathways $F_1$, $F_2$, $F_3$, $F_4$ have both water-hammer pressure and lifting of the residue on the cleanable surface, thereby providing enhances cleaning.

Figure 14:
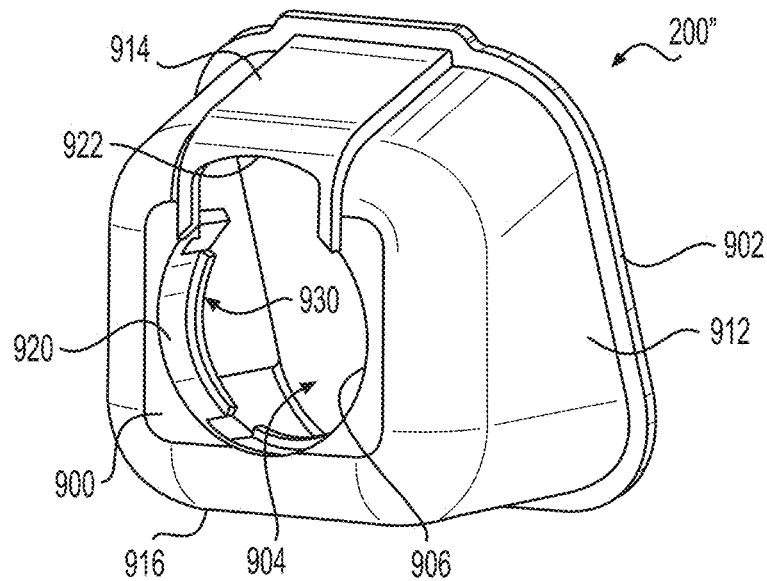
FIG. 14 is a front perspective view of a shroud of the camera lens washing device illustrated in FIGS. 8A and 8B.

Shroud 200" generally includes a front face 900, a rear opening 902 opposite the front face 900, an inner receiving area 906, opposite sidewalls 910 and 912 extending between front face 900 and rear opening 902, and top and bottom walls 914 and 916 extending between sidewalls 910 and 912, as best seen in FIG. 14.

Front face 900 has a lens opening 906 sized to accept ring portion 802 of washer housing 800 and the camera lens 10. As seen in FIG. 11, ring portion 802 is positioned in lens opening 906 such that washer side 814 of ring portion 802 is generally flush, that is flush or nearly flush, with front face 900 of shroud 200". Lens opening 906 includes an open extension 922 adapted to receive transition portion 806 of washer housing 800. The inner surface 920 of lens opening 906 includes one or more engagement members 930 corresponding to the one or more engagement members 830 of washer housing 800. Engagement members 930 of shroud 200" may be one or more tongues on which the snap legs of the engagement members 830 of ring portion 802 can snap to secure housing 800 to shroud 200". It will be appreciated that engagement members 830 and 930 may be either one of a tongue or snap leg and may be any other known engagement, as long as housing 800 is attached to shroud 200".

Figure 10:
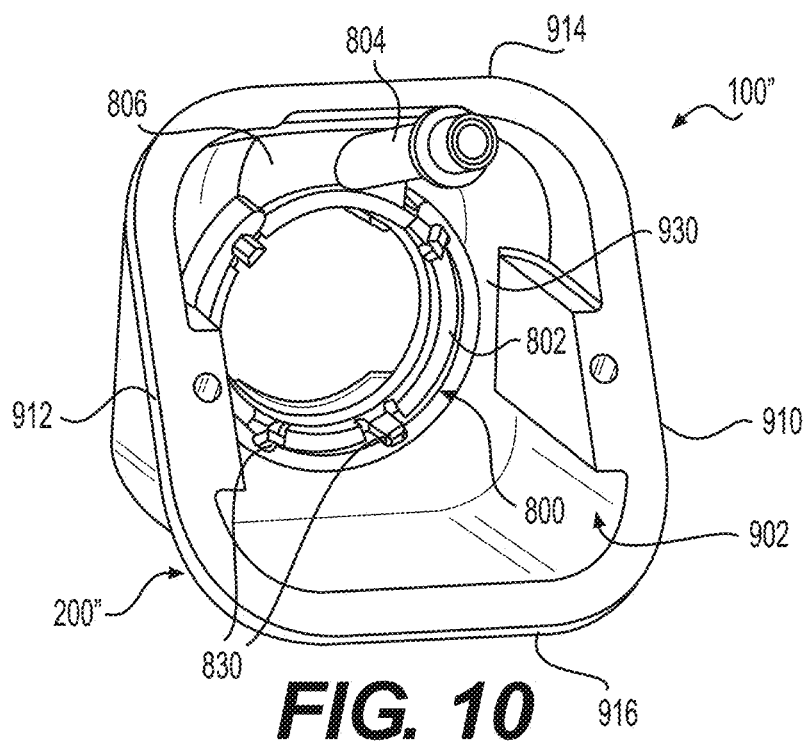
FIG. 10 is a rear perspective view of the camera lens washing device illustrated in FIGS. 8A and 8B, showing the device without the camera for clarity.

Washer housing 800 is compact in nature such that it can be received inside shroud 200", that is in inner receiving area 904, such that fluid source attachment 804 does not extend through or from any walls, including front face 900, sidewalls 910 and 912, and top and bottom walls 914 and 916 of shroud 200" and instead only extends through rear opening 902. In other words, as best seen in FIG. 10, fluid source attachment 804 can extend through the shroud's rear opening 902 for attachment to a fluid source with the top wall 914 of shroud 200" covering fluid source attachment 804. When installing the camera into the shroud's receiving area 904, the camera abuts the attachment side 812 of washer housing 800 such that the camera lens 10 is received in the main opening 810 of washer housing 800. Once the camera is installed, a locking bracket may be used to secure the camera in place in the overall camera module 14.

Figure 16:
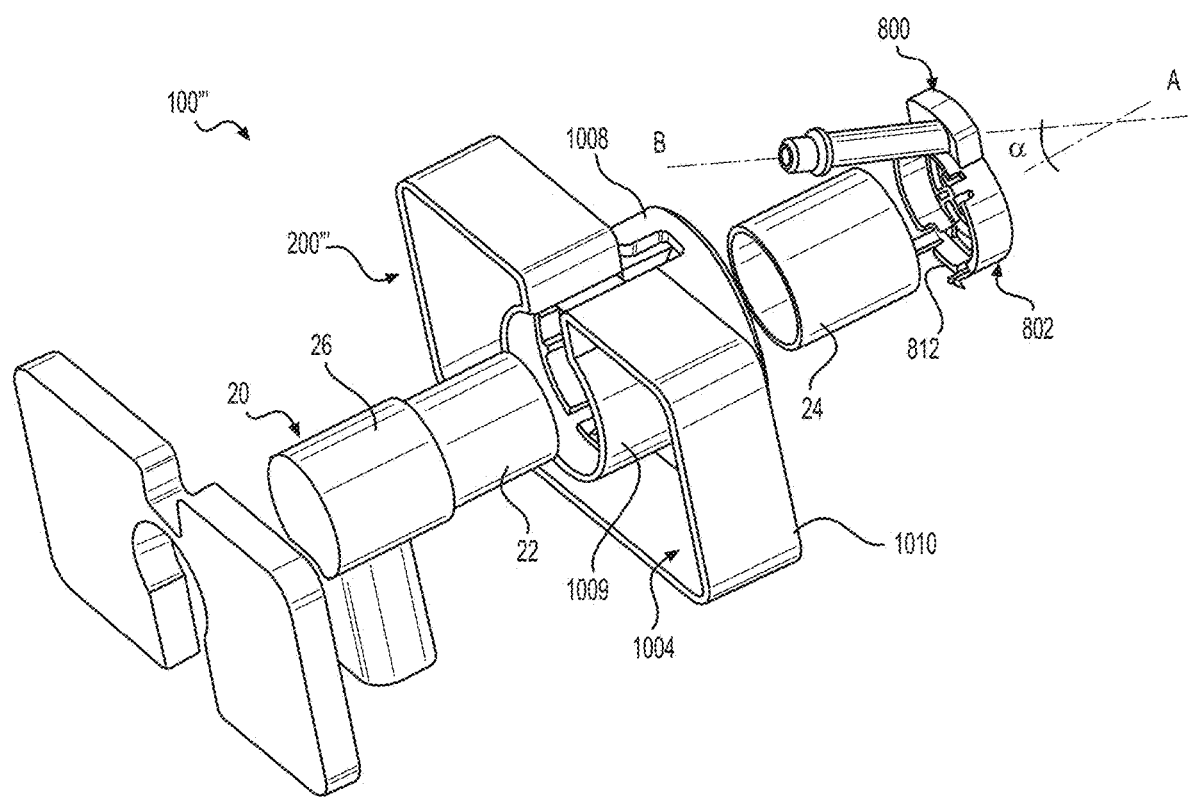
FIG. 16 is a exploded perspective view of a sensor washing device according to another exemplary embodiment of the present invention.
Figure 17A:
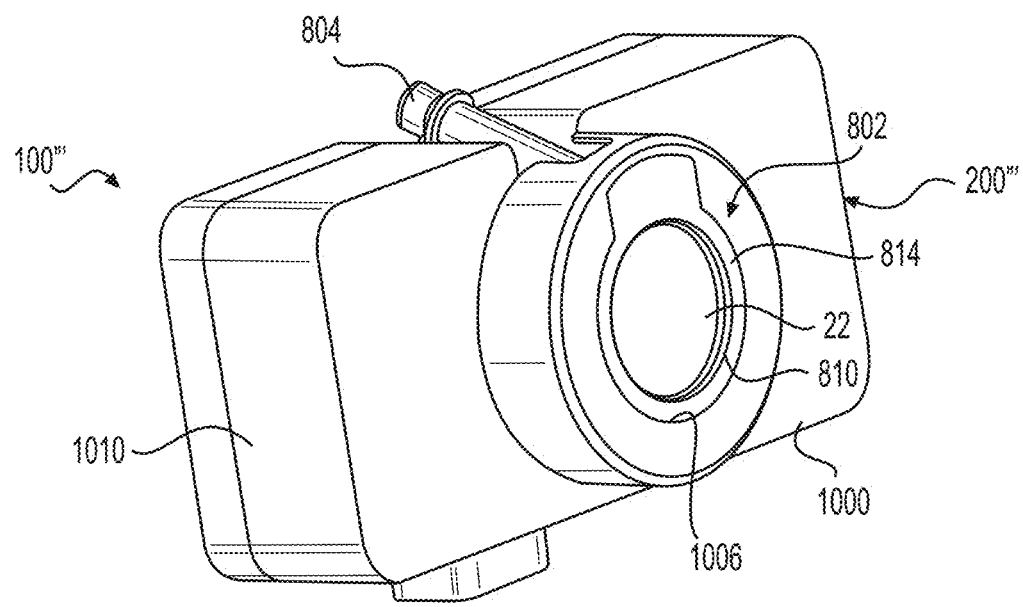
FIGS. 17A and 17B are front and rear perspective views of the assembly of the sensor washing device illustrated in FIG. 16.
Figure 17B:
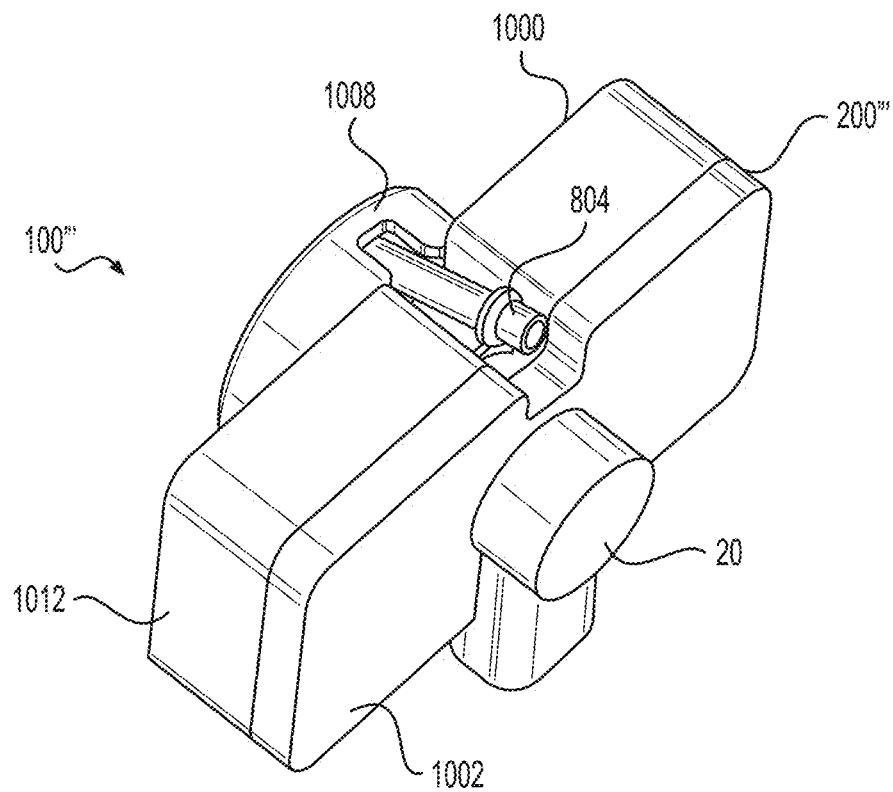

FIGS. 16, 17A and 17B illustrate yet another exemplary embodiment of a washing device 100''' of the present invention in which washer housing 800 may be used for cleaning a vehicle component, other than a camera lens, such as sensor 20, namely an ultrasonic sensor, an infrared sensor, and the like. Washing device 100''' may include a shroud 200''' that supports washer housing 800 and facilitates mounting of the washing device 100''' on a vehicle.

The main opening 810 of the ring portion 802 of washer housing 800 is configured to receive a portion of sensor 20, such as the detecting head 22 of sensor 20. A protective lens 24 may be provided around the sensor head 22. The attachment side 812 of ring portion 802 is configured for mounting washer housing 800 to shroud 200''', in a manner similar to that described above with regard to engagement members 830 (FIG. 12A). The washing side 814 of washer housing 800, which is in fluid communication with fluid source attachment 804, frames the sensor head 22.

As seen in FIG. 16, fluid source attachment 804 extends from transition portion 806 in a direction away from the washing side 814 of ring portion 802 (and toward shroud 200'''). Fluid source attachment 804 is angled with respect to ring portion 802, thereby defining an angle α between a central longitudinal axis A of ring portion 802 and the longitudinal axis B of fluid source attachment 804. In a preferred embodiment, the angle α is an acute angle to provide a compact washing device 100'''. Nozzles 820 (FIGS. 12A and 12B) of washer housing 800 are positioned and function the same as described in the embodiment above. That is nozzles 820 are designed to discharge fluid received from fluid source attachment 804 generally radially inwardly and downwardly towards main opening 810 and the sensor head 22.

Shroud 200''' generally includes a front wall 1000, a rear wall 1002, an inner receiving portion 1004, sidewalls 1010 and 1012 extending between front wall 1000 and rear wall 1002, and top and bottom walls 1014 and 1016. Front wall 1000 has an opening 1006 that receives the detecting head 22 of sensor 20. Opening 1006 preferably includes an extension 1008 that extends from an outer surface of front wall 1000. Extension 1008 may receive the ring and transition portions 802 and 806 of washer housing 800. A body section 1009 inside of shroud 200''' is shaped to receive the body 26 of sensor 20.

When washer housing 800 is assembled with shroud 200''', fluid source attachment 804 rests in a recessed cutout portion 1018 of the shroud's top wall 1014, as best seen in FIGS. 17A and 17B. The angle α of fluid source attachment 804 along with recessed cutout portion 1018 provides a compact design of washing device 100'''. Recessed cutout portion 1018 is preferably above the body section 1009, as best seen in FIG. 16.

Figure 18A:
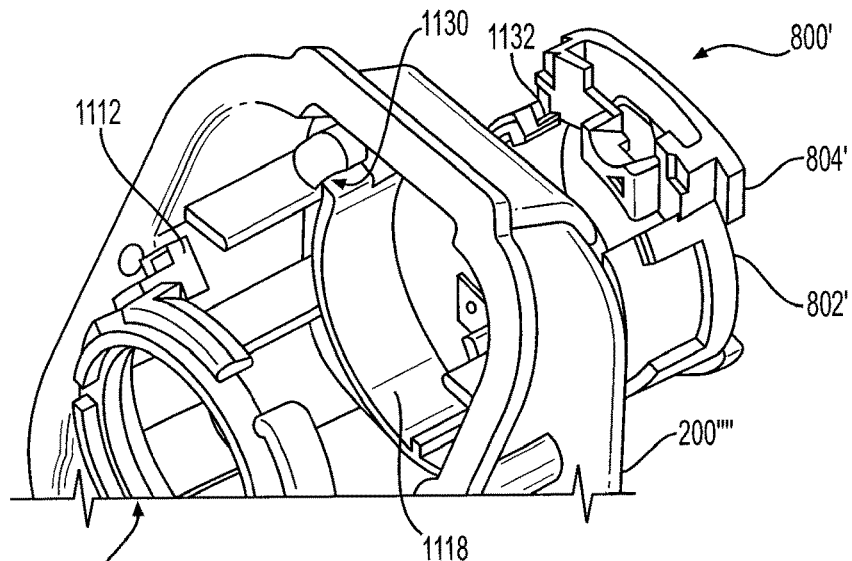
FIGS. 18A-18E are various views of an optionally mounting member and system for the washing device in accordance with the present invention.
Figure 18B:
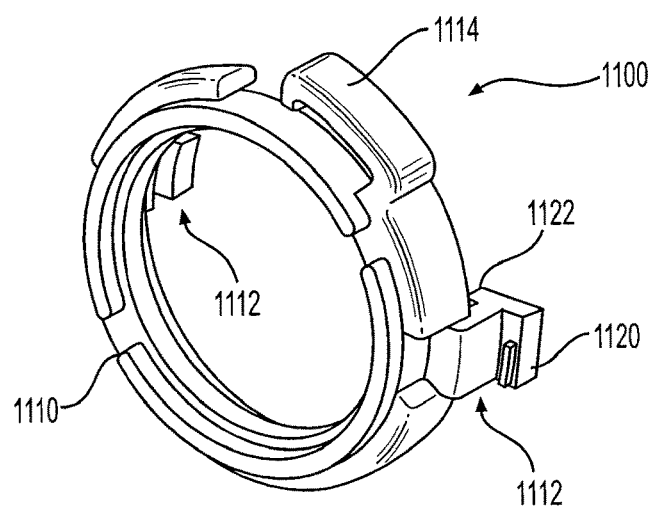
Figure 18C:
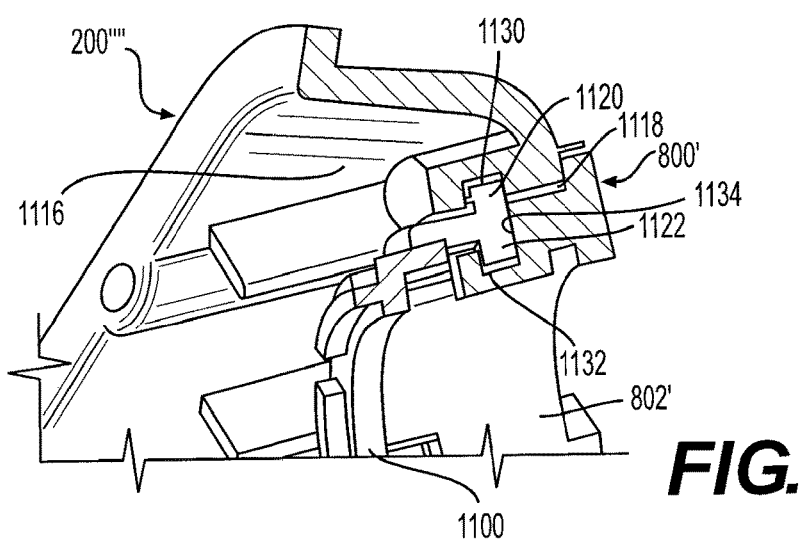
Figure 18D:
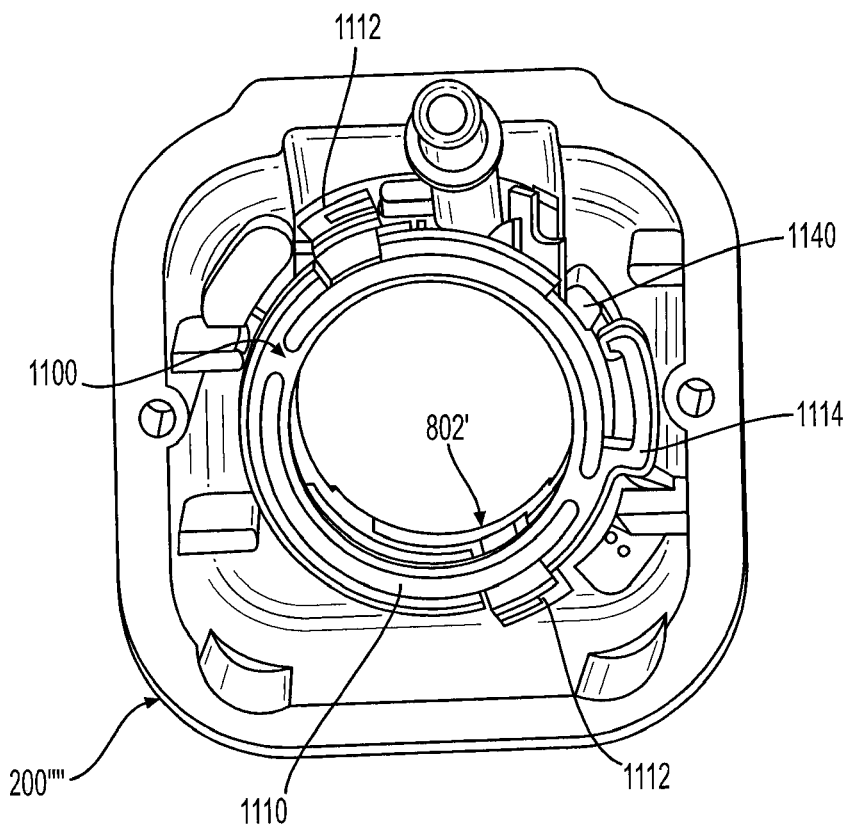
Figure 18E:
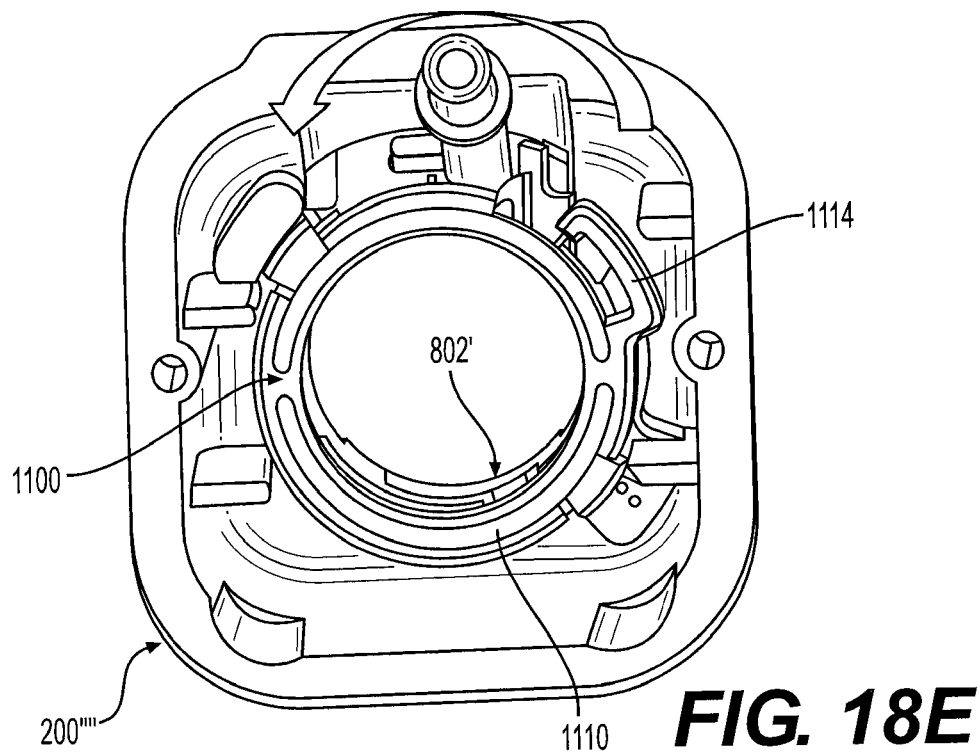

FIGS. 18A-18E illustrate an optional mounting member 1100 for mounting the washer housing, such as washer housing 800' and the vehicle accessory to a shroud, such as shroud 200''''. Mounting member 1100 (FIG. 18B) rotates between an unlocked position (FIG. 18D) with respect to the washer housing 800' and shroud 200'''' and an unlocked position (FIG. 18E). Mounting member 1100 has a ring body 1110 generally corresponding to ring portion 802' of washer housing 800'. Ring body 1110 has one or more locking features 1112 extending from one side thereof for engaging both the washer housing 800' and the shroud 200''''. Ring body 1110 may also have a flex arm 1114 extending therefrom that provides a secondary locking function particularly if the vehicle accessory is subject to certain conditions, such as vibration or shock.

Each locking feature 1112 is preferably a substantially T-shaped leg that extends from the ring body 1110. The T-shaped leg has one portion 1120 that is configured to engage an inner surface 1116 of shroud 200'''' and another opposing portion 1122 that is configured to engage the attachment side 814' of ring portion 802' of washer housing 800'. Corresponding pockets 1130 and 1132 are provided on the shroud's inner surface 1116 and the attachment side '814 of washer housing 800', respectively, that are designed to align in order to receive locking feature 1112 of mounting member 1100.

When mounting the vehicle accessory and washer housing 800' to shroud 200'''', mounting member 1100 and washer housing 800' are first brought together on either side of shroud 200'''' at is opening 1118, as seen in FIG. 18A. The pockets 1130 and 1132 of the shroud 200'''' and washer housing 800', respectively, are aligned to create a receiving area 1134 (FIG. 18C) for receiving locking feature 1110 and the mounting member 1100 is oriented in its unlocked position (FIG. 18D) such that the one or more locking features 1112 are outside of the respective receiving areas 1134. Mounting member 1100 may then be rotated, such as counterclockwise, as seen in FIG. 18E, to its locked position in which each locking feature 1112 is received in one of the receiving areas 1134. That is, the portion 1120 of the T-shaped leg is received in the pocket 1130 of shroud 200'''' and the opposition portion 1122 is received in the pocket 1132 of ring portion 802' of washer housing 800'. Flex arm 1114 may also engage an inwardly extending detent 1140 (FIG. 18D) of shroud 200'''' when mounting member 1100 is in the locked position to provide secondary locking in case of conditions, such as vibration or shock.

While particular embodiments have been chosen to illustrate the invention, it will be understood by those skilled in the art that various changes and modifications can be made therein without departing from the scope of the invention as defined in the appended claims.

What is claimed is:

1. A washing device for a vehicle accessory, comprising:
   a washer housing including a ring portion and a fluid source attachment, the fluid source attachment being configured to receive fluid, the ring portion comprising, a main opening for receiving at least a portion of the vehicle accessory, an attachment side configured for mounting the washer housing, a washing side configured to frame the vehicle accessory and being in fluid communication with the fluid source attachment, and a transition portion between the ring portion and the fluid source attachment, and the fluid source attachment comprising, a nozzle end engaging the transition portion of the ring portion, the nozzle end having at least one fluid channel defined by a nozzle protrusion on the nozzle end, the at least one fluid channel being configured to discharge the fluid to the washing side of the ring portion for cleaning the vehicle accessory by creating a plurality of fluid flow pathways of the fluid between the nozzle end and the transition portion, wherein the plurality fluid flow pathways interact with one another to form at least one vortex in the flow of the fluid,
   wherein the plurality of fluid flow pathways have different rates of flow.

2. A washing device according to claim 1, wherein the nozzle has a plurality of channels defined by the nozzle protrusion, each of the plurality of fluid channels is configured to discharge the fluid to the washing side for cleaning the vehicle accessory by creating a plurality of fluid flow pathways of the fluid between the nozzle end and the transition portion, wherein the plurality fluid flow pathways interact with one another to form vortices.

3. A washing device according to claim 2, wherein the vortices are in different planes such that the vortices are transverse to one another.

4. A washing device according to claim 1, wherein the transition portion includes a curved end wall that extends from the washing side of the ring portion and covers the at least one fluid channel for directing the fluid flow pathways.

5. A washing device according to claim 4, wherein the ring portion includes a curved protrusion for directing the fluid flow pathways, the curved protrusion extends from the washing side of the ring portion and that is located remote from the curved end wall of the transition portion.

6. A washing device according to claim 1, wherein the plurality of fluid flow pathways flow in different directions with respect to one another.

7. A washing device according to claim 1, wherein the at least one fluid channel has a narrow section that leads to an exhaust section that is wider than the narrow section.

8. A washing device for a vehicle accessory, comprising:
   a vehicle accessory with a cleanable surface;
   a shroud that supports the vehicle accessory, the shroud having a front wall with an opening that displays the cleanable surface of the vehicle assembly; and
   a washer housing including a ring portion and a fluid source attachment, the fluid source attachment being configured to receive fluid, the ring portion comprising, a main opening for receiving at least a portion of the vehicle accessory, an attachment side configured for mounting the washer housing to the shroud, a washing side configured to frame the cleanable surface of the vehicle accessory and being in fluid communication with the fluid source attachment, and a transition portion between the ring portion and the fluid source attachment, and the fluid source attachment comprising, a nozzle end engaging the transition portion of the ring portion, the nozzle end having a plurality of fluid channels defined by a nozzle protrusion on the nozzle end, each of the plurality of fluid channels being configured to discharge the fluid to the washing side of the ring portion for cleaning the cleanable surface of the vehicle accessory by creating a plurality of fluid flow pathways of the fluid between the nozzle end and the transition portion, wherein the plurality fluid flow pathways interact with one another to form vortices in the flow of the fluid, wherein the transition portion includes a curved end wall that extends from the washing side of the ring portion and covers the at least one fluid channel for directing the fluid flow pathways.

9. A washing device according to claim 8, wherein the fluid source attachment and the ring portion are separate components engageable with one another.

10. A washing system according to claim 8, wherein the vortices are in different planes.

11. A washing device according to claim 8, wherein the ring portion includes a curved protrusion for directing the fluid flow pathways, the curved protrusion extends from the washing side of the ring portion and that is located remote from the curved end wall of the transition portion.

12. A washing device according to claim 11, wherein a bottom of the ring portion at the curved protrusion is devoid of any fluid channels.

13. A washing device according to claim 8, wherein the plurality of fluid flow pathways flow in different directions with respect to one another.

14. A washing device according to claim 8, wherein the plurality of fluid flow pathways have different rates of flow.

15. A washing device according to claim 8, wherein each of the plurality of fluid channels has a narrow section that leads to an exhaust section that is wider than the narrow section.

16. A washing device according to claim 15, wherein the exhaust section has different length sides that diverge away from one another to create the plurality of fluid pathways with different lengths.

17. A washing device according to claim 16, further comprising a mounting member that has a ring body with at least one locking feature for engaging both the attachment side of the ring portion and an inner surface of the shroud.

18. A washing device according to claim 17, wherein the locking feature is a substantially T-shaped leg extending from the ring body, the attachment side of the ring portion includes at least one pocket for receiving a portion of the T-shaped leg and the inner surface of the shroud has at least one pocket for receiving another portion of the T-shaped leg.

19. A washing device for a vehicle accessory, comprising:
a vehicle accessory with a cleanable surface; a shroud that supports the vehicle accessory, the shroud having a front wall with an opening that displays the cleanable surface of the vehicle assembly;
a washer housing including a ring portion and a fluid source attachment, the fluid source attachment being configured to receive fluid, the ring portion comprising, a main opening for receiving at least a portion of the vehicle accessory, an attachment side configured for mounting the washer housing to the shroud, a washing side configured to frame the cleanable surface of the vehicle accessory and being in fluid communication with the fluid source attachment, and a transition portion between the ring portion and the fluid source attachment, and the fluid source attachment comprising, a nozzle end engaging the transition portion of the ring portion, the nozzle end having at least one fluid channel configured to discharge the fluid to the washing side of the ring portion for cleaning the cleanable surface of the vehicle accessory by creating at least one fluid flow pathway of the fluid between the nozzle end and the transition portion; and a mounting member being movable between unlocked and locked positions for mounting the washer housing to the shroud, the mounting member having a ring body with at least one locking feature that engages both the attachment side of the ring portion of the washer housing and an inner surface of the shroud when the mounting member is in the locked position, thereby securing the washer housing and vehicle accessory to the shroud.

20. A washing device according to claim 19, wherein the locking feature is a substantially T-shaped leg extending from the ring body, the attachment side of the ring portion includes at least one pocket for receiving a portion of the T-shaped leg, and the inner surface of the shroud has at least one pocket for receiving another portion of the T-shaped leg.

21. A washing device according to claim 20, wherein the mounting member further comprises a flex arm extending from the ring body that engages an inwardly extending detent of the shroud when the mounting member is in the locked position.

22. A method for washing a vehicle accessory with a cleanable surface, comprising the steps of:
using a washer housing including a ring portion and a fluid source attachment, the fluid source attachment being configured to receive and distribute fluid, the ring portion comprising a washing side configured to frame the cleanable surface of the vehicle accessory and being in fluid communication with the fluid source attachment, and the fluid source attachment comprising a nozzle end engaging the transition portion of the ring portion, the nozzle end having a plurality of fluid channels defined by a nozzle protrusion on the nozzle end;
discharging fluid from the fluid source attachment through the plurality of fluid channels to create a plurality of fluid flow pathways at the nozzle; and
directing the fluid discharged through the plurality of fluid channels to the cleanable surface of the vehicle accessory such that the fluid flow pathways interact with one another to form vortices and oscillation in the fluid, thereby cleaning residue from the cleanable surface,
wherein the plurality of fluid flow pathways have different rates of flow.

23. A method according to claim 22, further comprising the step of forming the vortices in different planes such that the vortices are transverse to one another.

24. A method according to claim 22, further comprising the step of mounting the washer housing to a shroud using a mounting member that moves between locked and unlocked positions wherein at least one locking feature engages pockets in the shroud and in the ring portion of the washer housing when in the locked position.

25. A method according to claim 24, further comprising the step of aligning the pockets of the shroud and the ring portion when the mounting member is in the unlocked position and rotating the mounting member to the unlocked position wherein the at least one locking feature engages the pockets.

26. A washing device for a vehicle accessory, comprising:
a washer housing including a ring portion and a fluid source attachment, the fluid source attachment being configured to receive fluid, the ring portion comprising, a main opening for receiving at least a portion of the vehicle accessory, an attachment side configured for mounting the washer housing, a washing side configured to frame the vehicle accessory and being in fluid communication with the fluid source attachment, and a transition portion between the ring portion and the fluid source attachment, and the fluid source attachment comprising, a nozzle end engaging the transition portion of the ring portion, the nozzle end having at least one fluid channel defined by a nozzle protrusion on the nozzle end, the at least one fluid channel being configured to discharge the fluid to the washing side of the ring portion for cleaning the vehicle accessory by creating a plurality of fluid flow pathways of the fluid between the nozzle end and the transition portion, wherein the plurality fluid flow pathways interact with one another to form at least one vortex in the flow of the fluid, wherein the nozzle has a plurality of channels defined by the nozzle protrusion, each of the plurality of fluid channels is configured to discharge the fluid to the washing side for cleaning the vehicle accessory by creating a plurality of fluid flow pathways of the fluid between the nozzle end and the transition portion, wherein the plurality fluid flow pathways interact with one another to form vortices, and the vortices are in different planes such that the vortices are transverse to one another.

* * * * *